(12) United States Patent
Gow et al.

(10) Patent No.: US 6,864,013 B2
(45) Date of Patent: Mar. 8, 2005

(54) MONOBLOCK BATTERY ASSEMBLY WITH CROSS-FLOW COOLING

(75) Inventors: Philippe Gow, Southfield, MI (US); Anthony Osgood, Rochester Hills, MI (US); Dennis A. Corrigan, Troy, MI (US); Lin R. Higley, Troy, MI (US); Marshall D. Muller, Farmington, MI (US); Stanford R. Ovshinsky, Bloomfield Hills, MI (US); Rajeev Puttaiah, Troy, MI (US)

(73) Assignee: Chevron Texaco Technology Ventures, LLC, Troy, MI (US)

( * ) Notice: Subject to any disclaimer, the term of this patent is extended or adjusted under 35 U.S.C. 154(b) by 0 days.

(21) Appl. No.: 10/391,886

(22) Filed: Mar. 19, 2003

(65) Prior Publication Data

US 2003/0232239 A1 Dec. 18, 2003

Related U.S. Application Data

(60) Division of application No. 09/670,155, filed on Sep. 26, 2000, now Pat. No. 6,689,510, which is a continuation-in-part of application No. 09/139,384, filed on Aug. 23, 1998, now Pat. No. 6,255,015.

(51) Int. Cl.$^7$ .............................................. H01M 10/50
(52) U.S. Cl. ...................................... 429/120; 429/153
(58) Field of Search .................................. 429/149, 151, 429/153, 156, 159, 120, 82, 71, 163, 176

(56) References Cited

U.S. PATENT DOCUMENTS

| | | | | |
|---|---|---|---|---|
| 5,356,735 A | * | 10/1994 | Meadows et al. | 429/120 |
| 5,906,899 A | * | 5/1999 | Noda et al. | 429/149 |
| 6,255,015 B1 | * | 7/2001 | Corrigan et al. | 429/149 |
| 6,635,380 B1 | * | 10/2003 | Shimoda et al. | 429/93 |
| 2002/0012833 A1 | * | 1/2002 | Gow et al. | 429/120 |

* cited by examiner

Primary Examiner—Raymond Alejandro
(74) Attorney, Agent, or Firm—Philip H. Schlazer; Marvin S. Siskind

(57) ABSTRACT

A multi-cell monoblock battery in which a plurality of electrochemical cells are disposed in a battery case. The battery case includes one or more cell partitions which divide the interior of the case into a plurality of cell compartments that house the electrochemical cells. Preferably, one or more coolant channels are integrally formed with at least one of the cell partitions. The coolant channels may have inlets and outlets disposed in the walls of the battery case so as to provide a cross-flow cooling design.

41 Claims, 23 Drawing Sheets

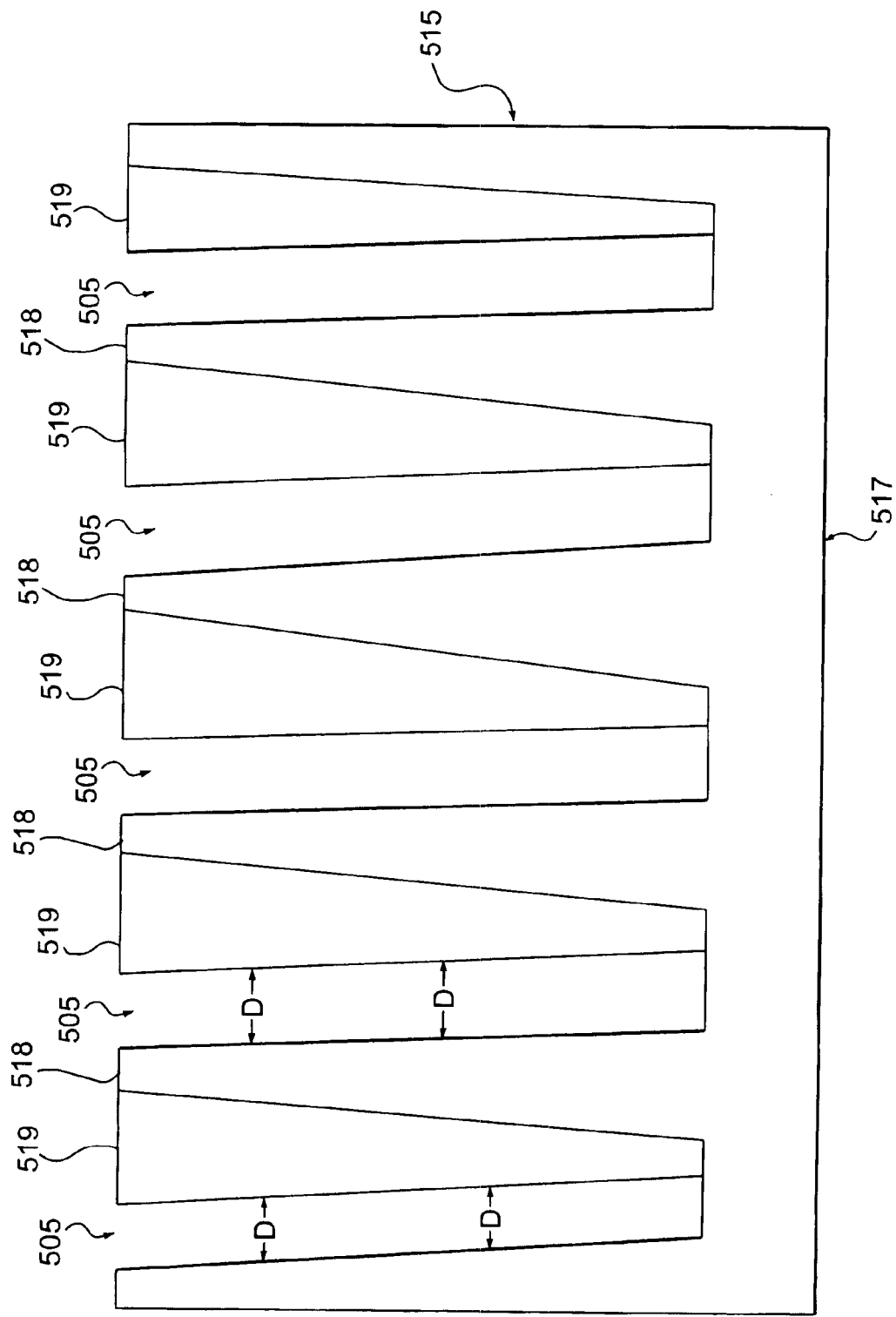

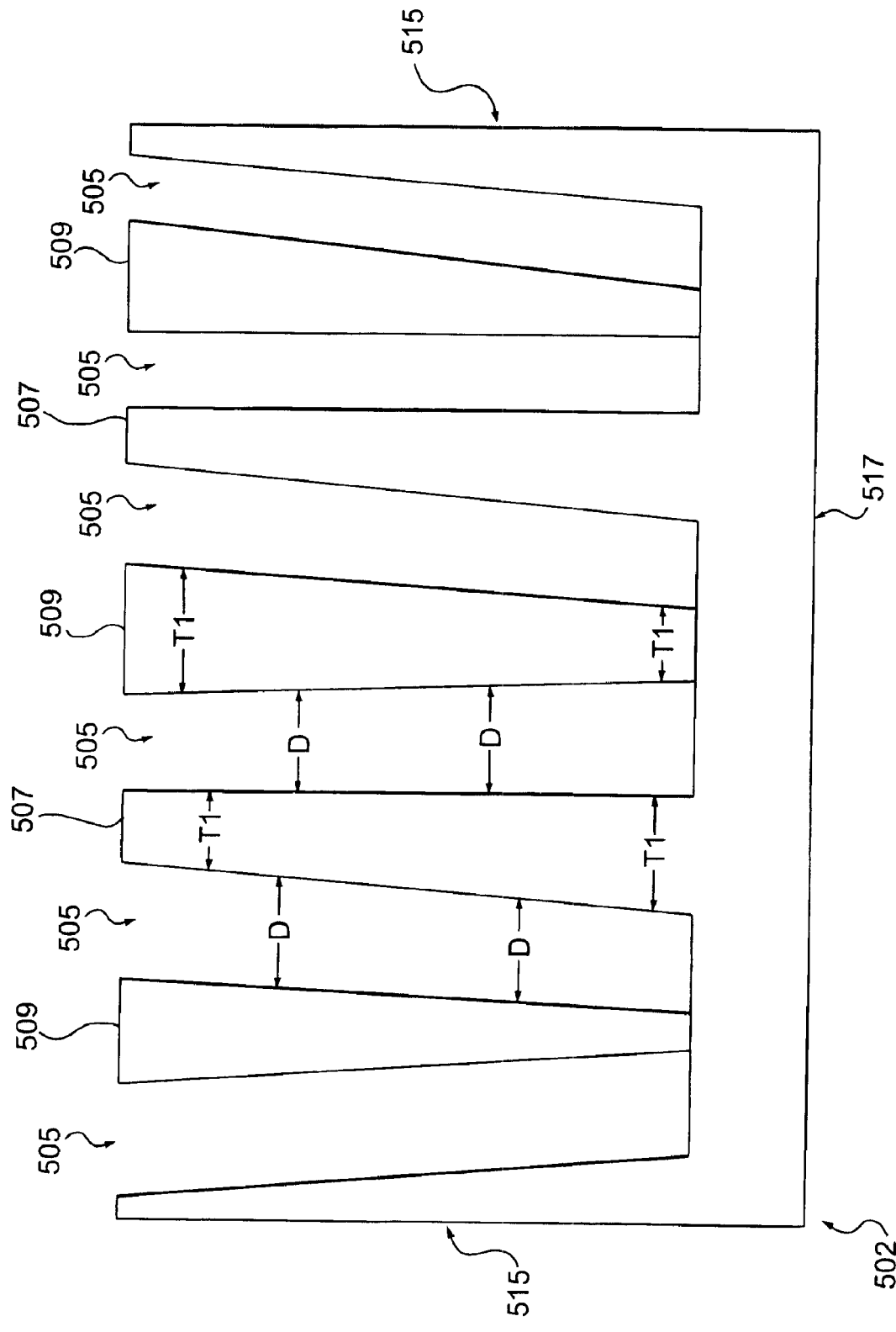

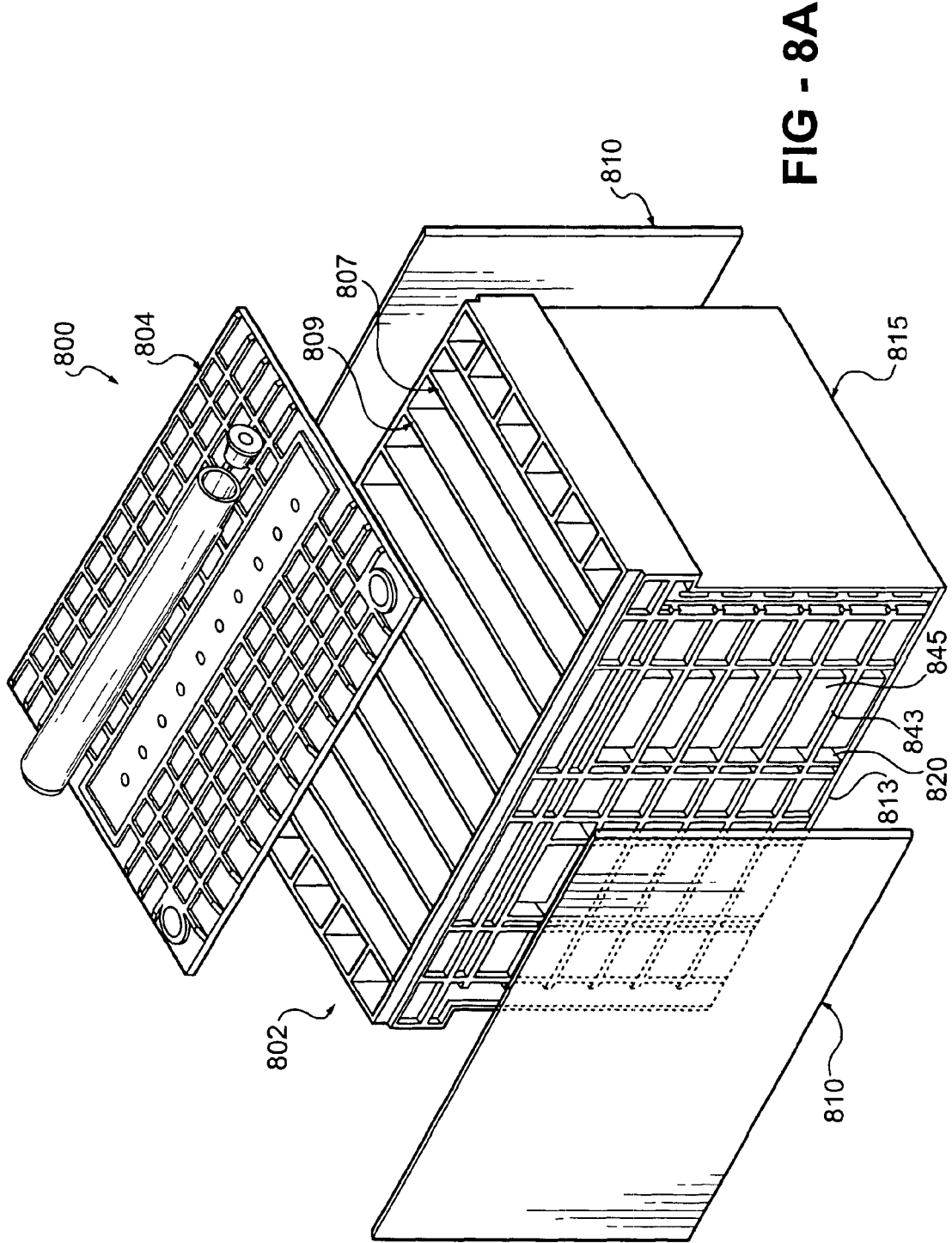

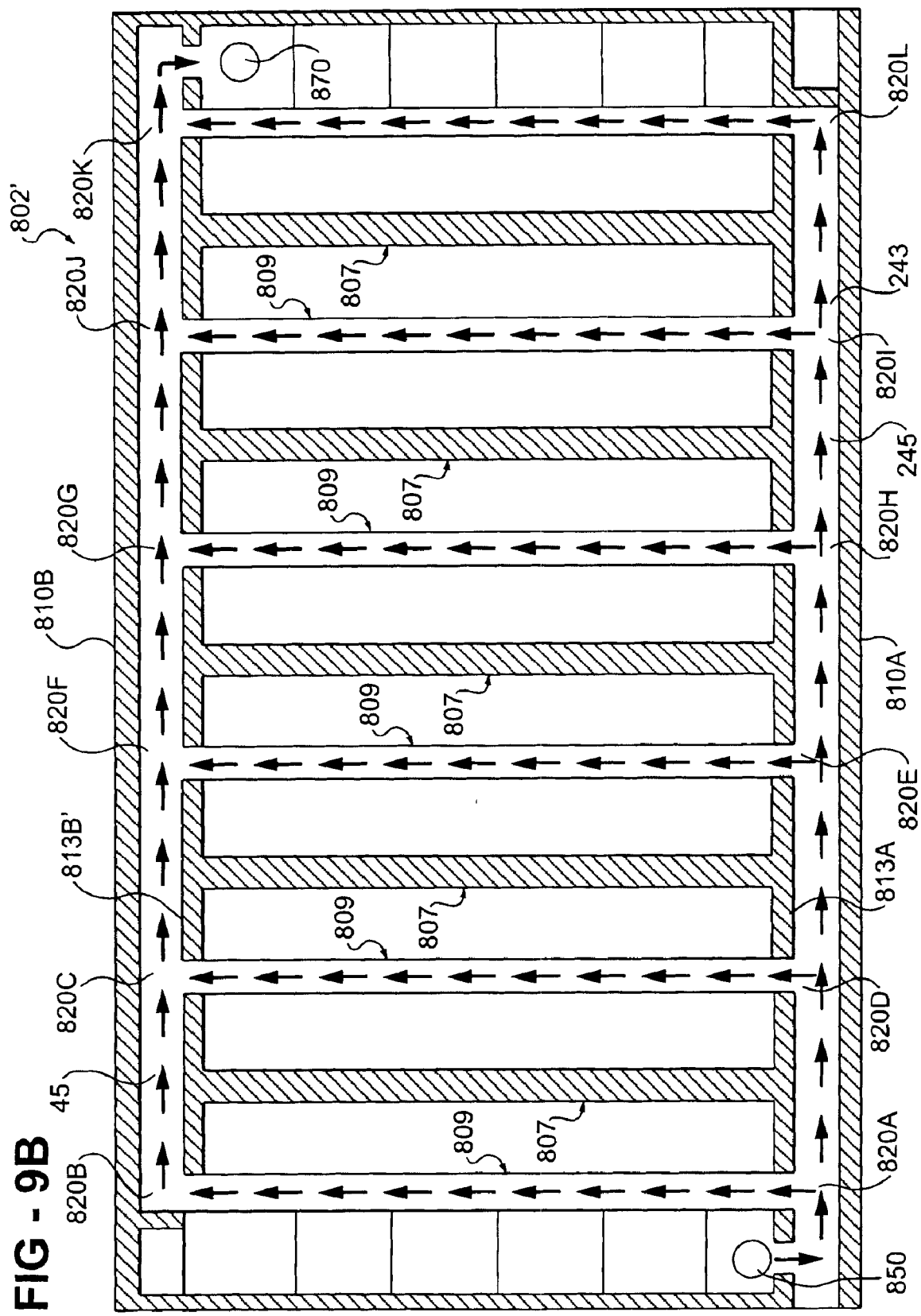

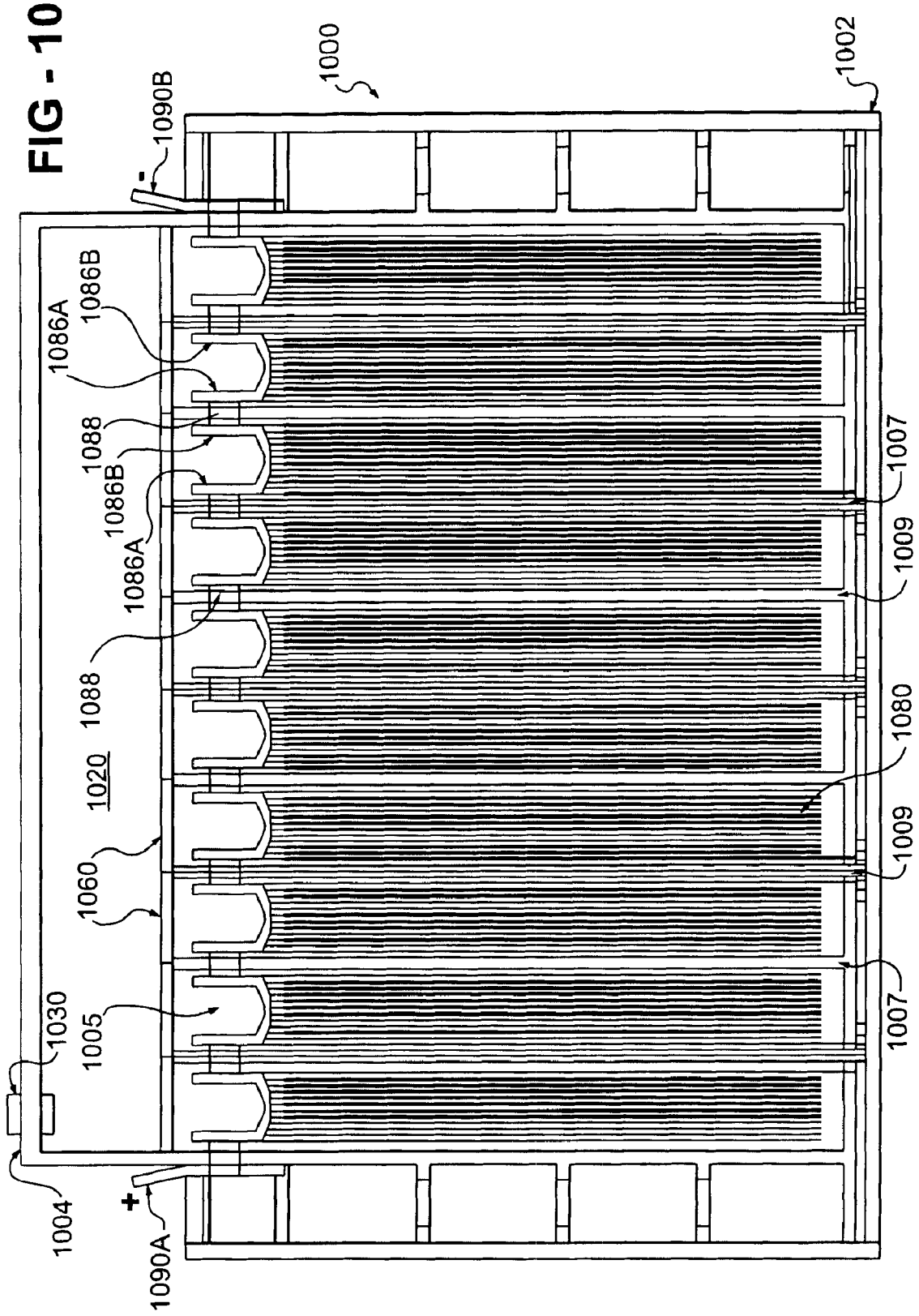

MONOBLOCK BATTERY ASSEMBLY WITH CROSS-FLOW COOLING

RELATED APPLICATION INFORMATION

This application is a divisional application of U.S. patent application Ser. No. 09/670,155, filed on Sep. 26, 2000, now U.S. Pat. No. 6,689,510, which is a continuation-in-part of U.S. patent application Ser. No. 09/139,384, filed Aug. 23, 1998, now U.S. Pat. No. 6,255,015. U.S. patent application Ser. No. 09/670,155 is hereby incorporated by reference herein.

FIELD OF THE INVENTION

The instant invention relates generally to improvements in rechargeable high performance batteries, modules and packs. Specifically, the invention relates to multi-cell, monoblock batteries.

BACKGROUND OF THE INVENTION

Rechargeable batteries are used in a variety of industrial and commercial applications such as fork lifts, golf carts, uninterruptable power supplies, and electric vehicles.

Rechargeable lead-acid batteries are a useful power source for starter motors for internal combustion engines. However, their low energy density (about 30 Wh/kg) and their inability to reject heat adequately, makes them an impractical power source for an electric vehicles (EV), hybrid electric vehicles (HEV) and 2–3 wheel scooters/motorcycles. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni—MH batteries") are far superior to lead-acid batteries, and Ni—MH batteries are the ideal battery available for electric vehicles, hybrid vehicles and other forms of vehicular propulsion. For example, Ni—MH batteries, such as those described in U.S. Pat. No. 5,277,999, the disclosure of which is incorporated herein by reference, have a much higher energy density than lead-acid batteries, can power an electric vehicle over 250 miles before requiring recharge, can be recharged in 15 minutes, and contain no toxic materials.

Extensive research has been conducted in the past into improving the electrochemical aspects of the power and charge capacity of Ni-MH batteries, which is discussed in detail in U.S. Pat. Nos. 5,096,667, 5,104,617, 5,238,756 and 5,277,999, the contents of which are all incorporated by reference herein.

Until recently the mechanical and thermal aspects of the performance of Ni—MH batteries have been neglected. For example, in electric vehicles and in hybrid vehicles, the weight of the batteries is a significant factor. For this reason, reducing the weight of individual batteries is a significant consideration in designing batteries for electric and hybrid vehicles. Battery weight should be reduced while still affording the necessary mechanical requirements of the battery (i.e. ease of transport, ruggedness, structural integrity, etc.).

Electric vehicle and hybrid vehicle applications introduce a critical requirement for thermal management. Individual electrochemical cells are placed together in close proximity and many cells are electrically coupled together. Therefore, since there is an inherent tendency to generate significant heat during charge and discharge, a workable battery design for electric and hybrid vehicles is judged by whether or not the generated heat is sufficiently controlled. Sources of heat are primarily threefold. First, ambient heat due to the operation of the vehicle in hot climates. Second, resistive or $I^2R$ heating on charge and discharge, where I represents the current flowing into or out of the battery and R is the resistance of the battery. Third, a tremendous amount of heat is generated during overcharge due to gas recombination.

Thus, there exists a need in the art for a battery design which reduces the overall weight thereof and incorporates the necessary thermal management needed for successful operation in electric and hybrid vehicles, without reducing its energy storage capacity or power output. One such battery design is a monoblock battery. Examples of monoblock batteries of the background art are provided in U.S. Pat. No. 5,356,735 to Meadows et al, the disclosure of which is incorporated by reference herein. Another example is provided in commonly assigned U.S. patent application Ser. No. 09/139,384, the disclosure of which is incorporated by reference herein. U.S. patent application Ser. No. 09/139,384 is now U.S. Pat. No. 6,255,015. The present invention is directed to a monoblock battery design having improved thermal management and improved structural integrity.

SUMMARY OF THE INVENTION

An object of the invention is a monoblock battery having improved thermal management capabilities. Another object of the invention is a monoblock battery with improved structural integrity. Still another object of the present invention is a monoblock battery with improved manufacturability.

These and other objects of the invention are satisfied by a multi-cell monoblock battery, comprising:
  a battery case including one or more cell partitions dividing the interior of the case into a plurality of cell compartments;
  at least one coolant channel integrally formed with at least one of the partitions, the coolant channel having an inlet and an outlet formed in one or more walls of the case; and
  a plurality of electrochemical cells disposed within the battery case.

These and other objects of the inventions are also satisfied by a multi-cell monoblock battery, comprising:
  a battery case comprising:
    walls, a bottom, and a lid,
    one or more cell partitions dividing the interior of the case into a plurality of cell compartments, and
    one or more coolant channels integrally formed with at least one of the cell partitions to form one or more coolant partitions, at least one of the coolant partitions integrally formed with at least one of the walls and/or the bottom and/or the lid as a one-piece construction; and
  a plurality of electrochemical cell disposed in the battery case.

These and other objects of the invention are also satisfied by a multi-cell monoblock battery, comprising:
  a battery case including a plurality of cell partitions dividing the case into cell compartments, the cell partitions including at least a first cell partition having a draft angle and a second cell partition tapering opposite the draft angle; and
  a plurality of electrochemical cells disposed in the case.

These and other objects of the invention are also satisfied by a multi-cell monoblock battery, comprising:

a battery case including one or more cell partitions dividing the interior of the case into a plurality of cell compartments;

one or more coolant partitions disposed within at least one of the cell compartments, each of the coolant partitions having at least one coolant channel; and a plurality of electrochemical cells disposed in the case.

These and other objects are satisfied by a multi-cell monoblock battery, comprising:

a battery case including one or more cell partitions dividing the interior of the case into a plurality of cell compartments; and a plurality of electrochemical cells disposed within the battery case, the case being a common pressure vessel for the electrochemical cells.

BRIEF DESCRIPTION OF THE DRAWINGS

FIG. 5B is a side view of a monoblock container showing an alternate arrangement of fixed and insertable partitions;

FIG. 5C is an embodiment of the monoblock container showing an arrangement of fixed divider partitions and insertable coolant partitions;

FIG. 8A is an exploded view of an embodiment of the monoblock battery case of the present invention showing the container, the lid and side wall cover plates;

FIG. 9B is a top view of the monoblock container showing the flow of coolant through the container is a parallel flow configuration;

FIG. 10 is a cross-sectional view of an embodiment of the monoblock battery of the present invention showing the electrical interconnections between the partitions as well as the common gas region;

DETAILED DESCRIPTION OF THE INVENTION

The present invention is directed to a multi-cell monoblock battery. The monoblock battery comprises a plurality of electrochemical cells that are disposed in a specially designed battery case referred to herein as a "monoblock case". Preferably, the monoblock case of the present invention is formed of a non-conductive material. Examples of materials which may be used include a plastic material and a ceramic material. Specific materials that could be used are presented in U.S. Pat. No. 5,800,945, the disclosure of which is incorporated by reference herein.

Figure 1A:
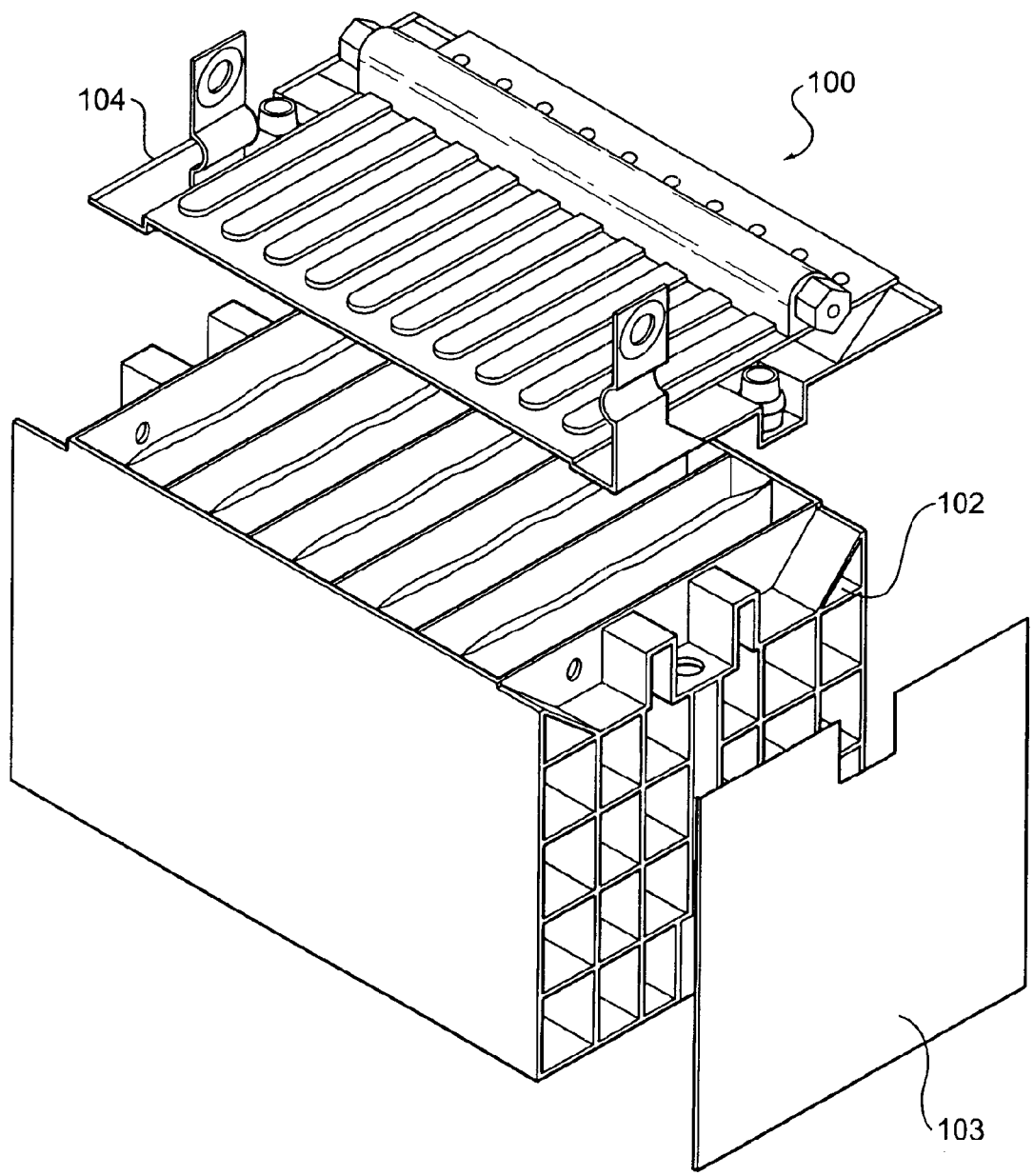
FIG. 1A is a three-dimensional view of an embodiment of a monoblock battery case of the present invention showing both the container and the lid.

FIG. 1A is an embodiment of a monoblock case of the present invention. Referring to FIG. 1A, the monoblock case 100 includes a monoblock container 102 and a lid 104 for the container. One or more end plates 103 may be used to provide additional structural support.

Figure 1B:
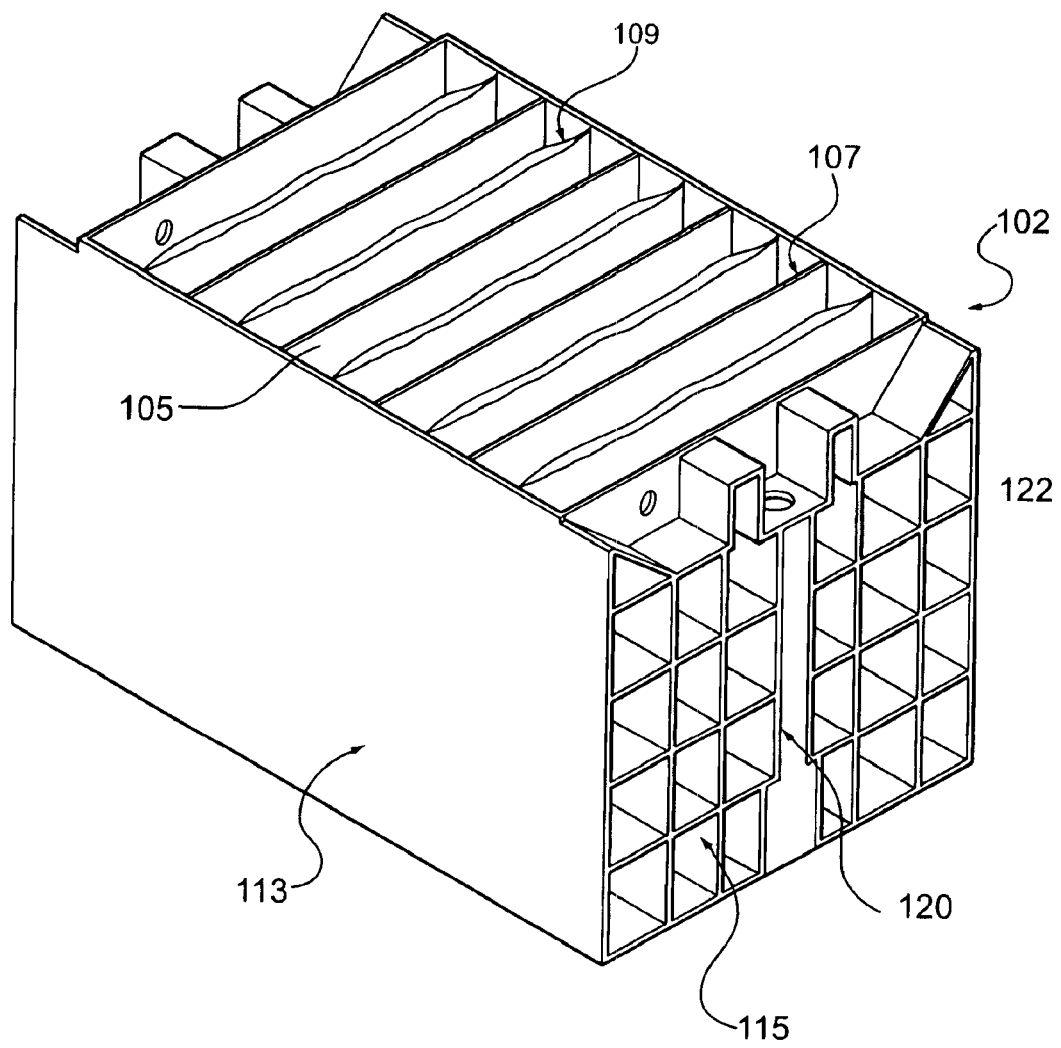
FIG. 1B is a three-dimensional view of the a container for a monoblock battery case.

The monoblock container includes a plurality of walls and a container bottom. Referring to FIG. 1B, it is seen that the embodiment of the monoblock container 102 has four walls. Two opposite walls of the container are referred to as "side walls" 113 and two are referred to as "end walls" 115. Preferably, the end walls are the walls of the container that are substantially parallel to the electrode plates of the electrochemical cells positioned inside the container.

Referring again to FIG. 1B, it is seen that the end walls 115 of the container 102 may be specially designed to minimize bulging of the end walls and to insure that the electrochemical cells are held within the cell compartments under a uniform compression. As shown in FIG. 1B, the end walls 115 may be formed as a rectangular honeycomb to provide additional structural support.

The monoblock container of the present invention includes one or more cell partitions which divide the interior of the container into a plurality of cell compartments. In the embodiment of the container shown in FIG. 1B, the monoblock container includes a plurality of cell partitions 107, 109 which divide the interior of the container (and hence, the interior of the case 100) into cell compartments 105. A cell compartment 105 may be defined by the region between two of the cell partitions, or by the region between a cell partition and an end wall. In one embodiment of the invention, the cell partitions may be substantially planar and plate-like in form.

Figure 2A:
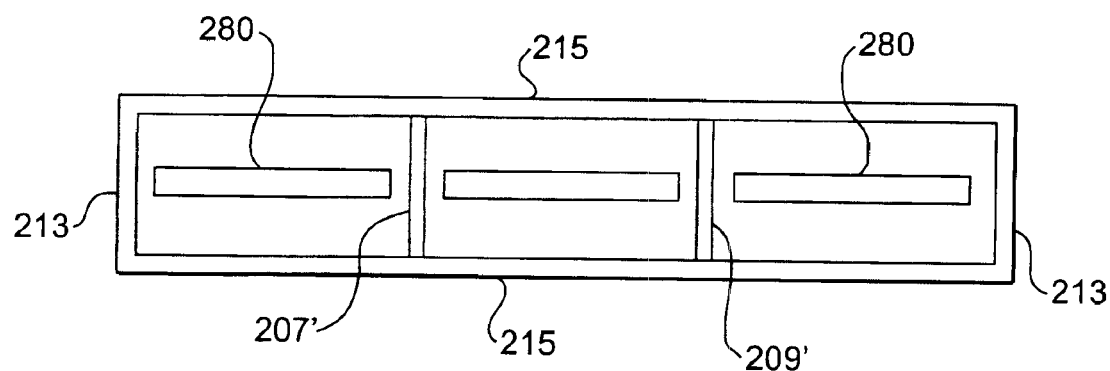
FIG. 2A is a top view of an embodiment of a monoblock battery of the present invention having cell partitions substantially parallel to the side walls of the container.
Figure 2B:
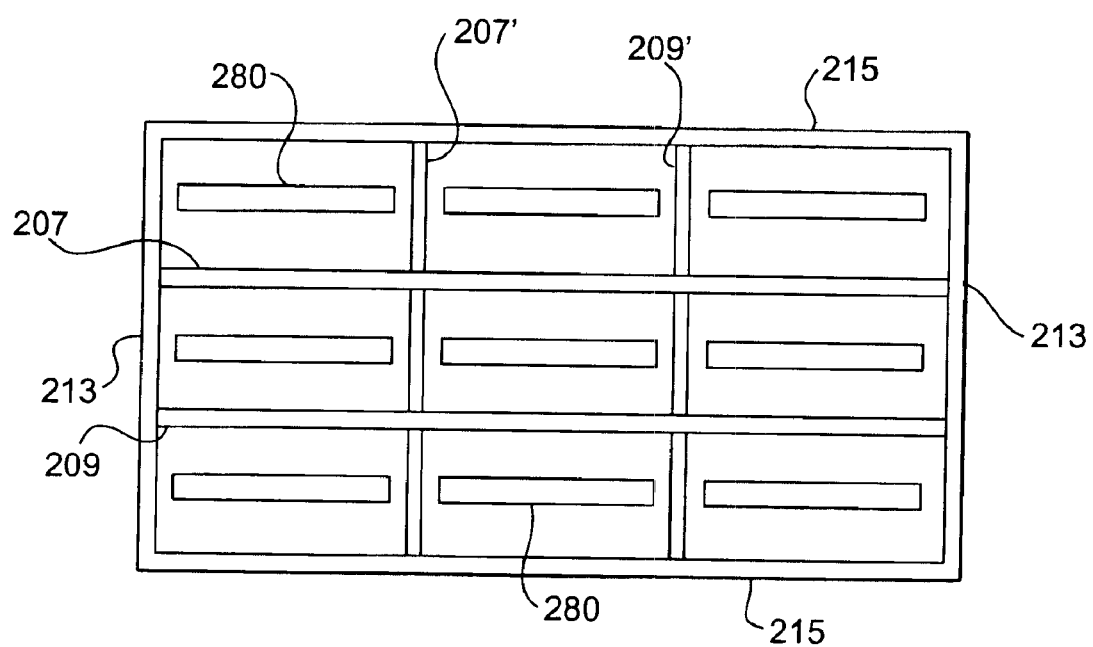
FIG. 2B is a top view of an embodiment of a monoblock battery of the present invention having a set of cell partitions substantially parallel to the end walls of the container and a set of cell partitions substantially parallel to the side walls of the container.

In the embodiment shown in FIG. 1B, the cell partitions 107, 109 are oriented substantially parallel to the end walls 115. However, in an alternate embodiment of the invention, it is possible that the cell partitions be positioned so that they are substantially parallel to the side walls of the container. FIG. 2A shows a monoblock container 202A with electrode plate stack 280 (substantially parallel to the end walls 215) and cell partitions 207', 209' substantially parallel to the side walls 215. In yet another embodiment of the invention it is also possible that the container is divided into an array of cell compartments. FIG. 2B shows a monoblock container 202B having a first set of partitions 207 and 209 substantially parallel to the end walls 215 and second set of cell partitions 207' and 209' substantially parallel to the side walls 213. Once again, the electrode plate stack 280 is substantially parallel to the end walls 215.

The monoblock container of the present invention may include one or more coolant channels. Preferably, the coolant channels are integrally formed with at least one of the cell partitions. The coolant channels may be formed on the surface of the cell partitions or they may be formed within (in the interior of) the cell partitions. A cell partition which includes one or more coolant channels is referred to herein as a "coolant partition". In one embodiment, the monoblock battery of the present invention includes at least one coolant partition.

A coolant partition may be formed in different ways. It may be formed from a plurality of pieces. For example, it may be formed from two separate plates, referred to as "clamshell" plates, that are affixed together. The inside surface of one or both of the clamshell plates may be ribbed to define baffles for flow purposes. (The ribs may be molded into the plates). When the two clamshell plates are placed together, the inside surface of one of the plates co-operates with the inside surface of the other clamshell plate to define the coolant channels.

The coolant partition may also be formed by first forming the coolant channels separate pieces (for example, as fluid tubules) and then affixing the coolant channels (for example, by using a sealant, heat sealing, ultrasonic welding, etc.) to one or both faces of a cell partition (or even to an inside surface of one or both of the clamshell plates).

Alternately, the coolant partition with its coolant channels may be integrally formed as a one-piece construction. This may be done in different ways, such as by using a molding process. For example, the coolant channel may be molded into the interior of the coolant partition or onto the outside surface of the coolant partition. It is also possible that the coolant partition (with its one or more coolant channels) be formed by an extrusion process or even be machined as a one-piece construction.

The coolant partitions provide a thermal management function. The thermal management function is preferably a cooling function to cool the battery and transfer heat away from the electrochemical cells. However, it is possible that the same coolant channels be used to heat the battery and to transfer heat to the electrochemical cells. To perform a thermal management function, the coolant channels house a coolant which flows through the coolant channels. The coolant may be a fluid such as a liquid or a gas. Examples of liquid coolants are water or a water/glycol mixture. An example of gaseous coolant is air. Preferably, the coolant is a liquid. Again, while it is preferable that the coolant be used to transfer heat away from the electrochemical cells, it is also possible that a coolant be used to transfer heat to the electrochemical cells. Hence, a liquid or a gas may be circulated through the coolant channels to either extract heat from the electrochemical cells or to supply heat to the electrochemical cells.

A cell partition which does not include any coolant channels is referred to herein as a "divider partition". Hence, a cell partition may be a coolant partition (if it includes one or more coolant channels) or a divider partition (if it does not include any coolant channels).

The cell partitions (the coolant partitions as well as the divider partitions) may be either "fixed partitions" or "insertable partitions". A cell partition is a "fixed partition" if it is integrally formed with at least one of the walls of the container and/or with the container bottom as a one-piece construction. In one embodiment, the fixed partition(s) are integrally formed with two opposing walls (such as two side walls) as a one-piece construction. In another embodiment, the fixed partition(s) are integrally formed with the container bottom as a one-piece construction. In yet another embodiment, the fixed partition(s) are integrally formed with two opposing walls (such as two sidewalls) and with the container bottom as a one-piece construction. In still another embodiment, the fixed partition(s), all four of the walls (i.e., the two side walls and the two end walls), and the bottom are all of one-piece construction.

Figure 3:
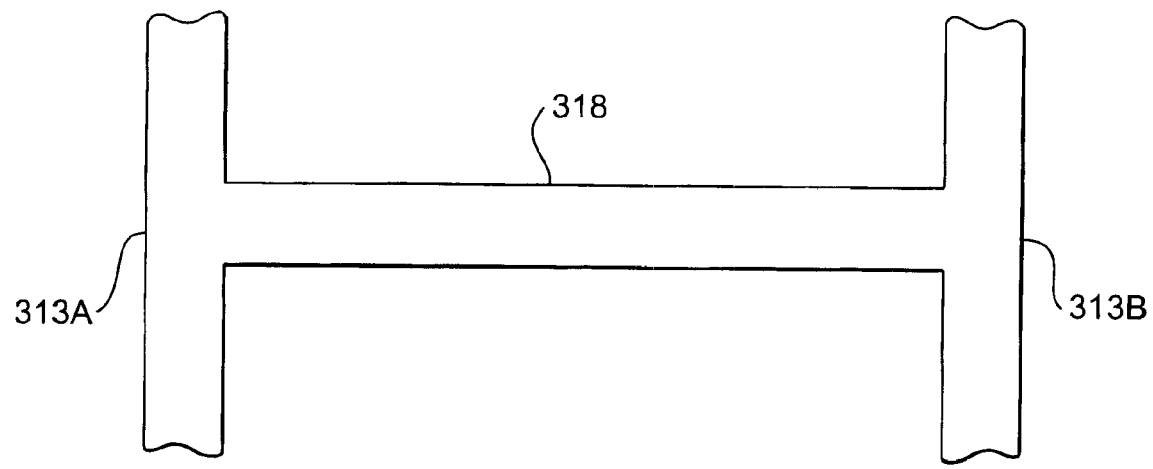
FIG. 3 is a top view of a fixed partition integrally formed with the container side walls as a one-piece construction.

FIG. 3 is a top view of a portion of an embodiment of a monoblock container of the present invention showing a fixed partition 318, a portion of a first side wall 313A and a portion of a second side wall 313B which is opposite the first sidewall. The fixed partition 318, the first side wall portion 313A and the second side wall portion 313B are all integrally formed as a one-piece construction. (Of course, the side wall portions may be replaced with end wall portions).

Figure 4:
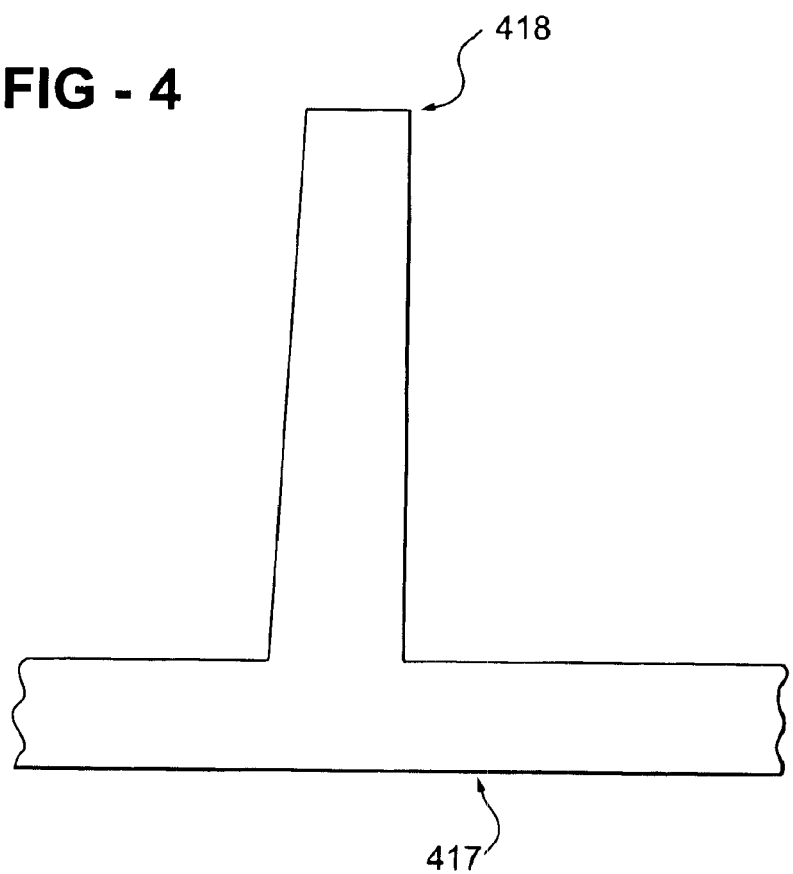
FIG. 4 is a side view of a fixed partition integrally formed with the container bottom as a one-piece construction.

FIG. 4 is cross-sectional view of a portion of an embodiment of a monoblock container of the present invention, parallel to the side walls, showing a fixed partition 418 that is formed integral with a bottom portion 417 of the container as a one-piece construction.

It is noted that a cell partition may also be formed integral with at least a portion of the case lid as a one piece construction.

Cell partitions that are insertable are first manufactured separate from the walls and the container bottom, and are then inserted into the container. Preferably, they are affixed to the walls and bottom. They may be affixed to the walls and to the bottom of the container in different ways. For example, they may be sealed to the walls and/or bottom with the use of a sealant or with ultrasonic welding (or other means) so that they cannot be removed. Alternately, insertable partitions may be affixed to the walls and/or to the bottom so that they can be removed. For example, they may be inserted in place and sealed at their side and bottom edges with gaskets and/or molding. Preferably, the insertable partitions are sealed into the container so as to form a substantially liquid-tight seal between adjacent cell compartments.

In one embodiment of the monoblock container, the container includes at least one fixed partition. Having at least one fixed partition provides for increased structural integrity of the monoblock container. In particular, fixed partitions that are formed with the side walls and/or the container bottom as a one-piece construction may prevent the bulging of the side walls and/or the bulging of the container bottom. This is especially important at the operating pressures of certain batteries such as sealed nickel-metal hydride batteries. The one or more fixed partitions may include only coolant partitions, they may include only divider partitions, or they may include a combination of at least one coolant partition and at least one divider partition.

Figure 5A:
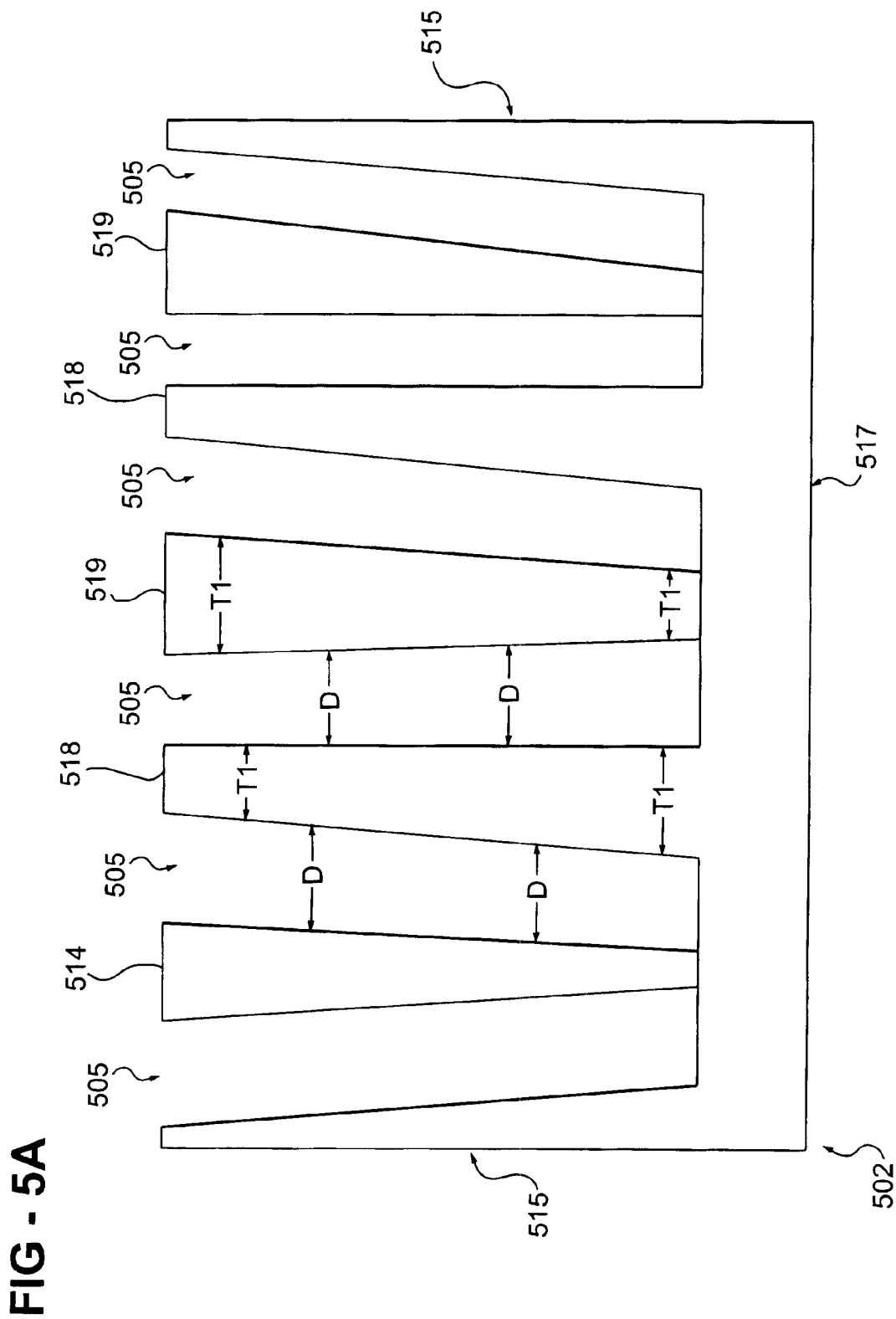
FIG. 5A is a side view of a monoblock container showing an arrangement of fixed and insertable partitions.

The monoblock container of the present invention may include all fixed partitions, all insertable partitions, or at least one fixed partition and at least one insertable partition. FIG. 5A is a cross-sectional view of an embodiment of a monoblock container showing a specific arrangement of alternating fixed partitions 518 and insertable partitions 519. The cross-section is parallel to the side walls of the container. As seen in FIG. 5A, the fixed partitions 518 may be manufactured with a "draft angle". That is, they may be made to taper so that the thickness (dimension parallel to the side walls) of each fixed partition 518 progressively gets smaller from its bottom end (the end adjacent to the container bottom 517) toward its top end (the end remote to the container bottom 117). Hence, for the fixed partitions the thickness T1 at the bottom end is preferably greater than the thickness T2 at the top end. The draft angle may also be included in the end walls and/or the side walls of the container. The draft angle is used to facilitate the injection molding process of the container. The draft angle in the fixed partitions and/or end walls and/or side walls may facilitate manufacturability by allowing the container to be more easily separated from the mold.

The embodiment of the monoblock container 502 shown in FIG. 5A includes insertable partitions 519 that are manufactured separately from the walls and bottom of the container. The insertable partitions 519 may be manufactured so as to taper in a direction opposite to the fixed partitions and/or end walls. As seen in FIG. 5A, they are made to taper so the thickness of each insertable partition gets progressively larger from its bottom end to its top end. Hence, the thickness T2 at the top end is preferably greater than the thickness T1 at the bottom end. This "reverse tapering" of the insertable partitions compensates for the "draft angle" that is manufactured into the fixed partitions and/or end walls so that the distance "D" between an insertable partition 519 and an adjacent fixed partition 118 (or an adjacent end wall 515) is thus substantially uniform. This results in cell compartments 505 having a substantially uniform width "D" (distance between partitions, or partition and end wall) and insures uniform compression across the surface of an electrochemical cell placed within the cell compartment. FIG. 5A demonstrates how fixed partitions 518 and insertable partitions 519 can be used in combination in a monoblock container to provide both structural integrity of the container as well as uniform compression of the electrochemical cells.

In the embodiment shown in FIG. 5A, each insertable partition (as well as each fixed partition) separates one cell compartment 505 from an adjacent cell compartment. Hence, the insertable partitions are sealed into the container so as to form a substantially liquid-tight seal between adjacent cell compartments. Each of the fixed partitions 518 may be either a coolant or a divider partition. Likewise, each insertable partition 519 may be either a coolant or a divider partition.

FIG. 5B is another embodiment of the monoblock container of the present invention showing an alternate arrangement of fixed partitions 518 and insertable partitions 519. In the embodiment shown in FIG. 5B, an insertable partition 519 is positioned adjacent to each of the fixed partitions 518 as well as adjacent to one of the end walls 515. The "reverse" draft angle of the insertable partitions is sufficient to compensate of the draft angle of the fixed partitions and end walls such that the width "D" of the cell compartments is substantially uniform. The embodiment shown in FIG. 5B also shows how fixed partitions 518 and insertable partitions 519 can be used in combination to provide both structural integrity of a monoblock container as well as uniform compression of the electrochemical cells held within the container. It is noted that in the embodiment shown in FIG. 5B, each of the cell compartments 505 is separated from an adjacent cell compartment by a fixed partition 518 which prevent the electrolyte from one cell compartment from entering another cell compartment. Hence, in this particular embodiment, the insertable partitions do not have to be sealed to either the side walls or the bottom of the container.

As discussed above, the monoblock battery of the present invention preferably includes at least one coolant partition. The coolant partitions may be fixed and/or insertable. Hence, in general, all of coolant partitions in a monoblock container may be fixed, all of the coolant partitions may be insertable, or at least one coolant partition may be fixed and at least one coolant partition may be insertable. Likewise, the divider partitions may be fixed partitions and/or insertable partitions. Hence, in general, all of the divider partitions may be fixed, all of the divider partitions may be insertable, or at least one divider partition may be fixed and at least one divider partition may be insertable.

In one embodiment of the invention, all of the coolant partitions are insertable while all of the divider partitions are formed as fixed partitions. Making the coolant partitions insertable provides greater flexibility in the dimensions of the walls of the coolant partitions. Not only can they be formed so that the coolant partitions taper opposite to the fixed partitions (as discussed above), but they can also be formed with thinner walls, thereby providing for increased cooling capability.

Figure 5D:
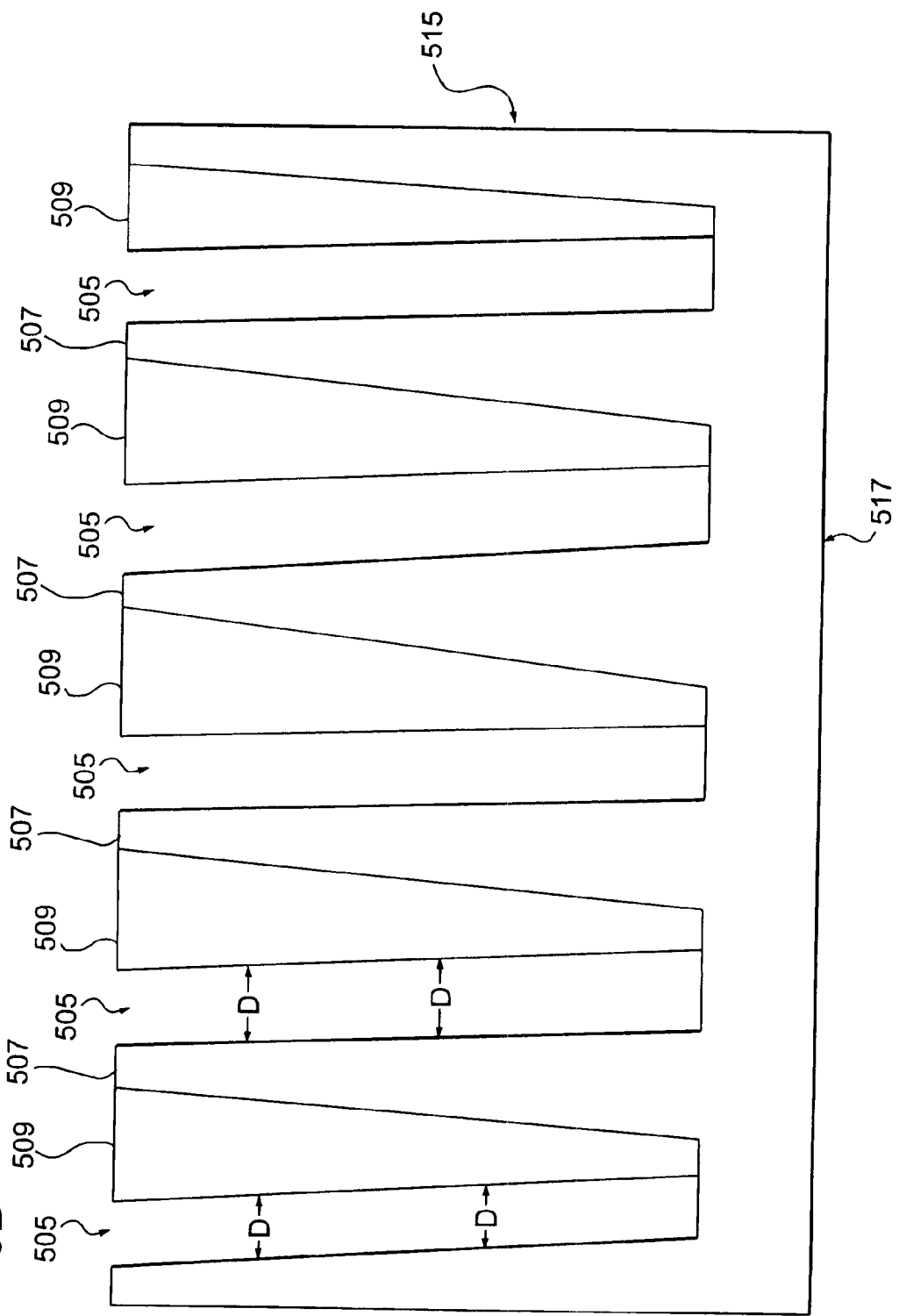
FIG. 5D is an embodiment of the monoblock container showing an alternate arrangement of fixed divider partitions and insertable coolant partitions.

FIG. 5C shows an embodiment where all of the coolant partitions 509 are insertable while all of the divider partitions 507 are fixed. (FIG. 5C is similar to FIG. 5A—the fixed partitions 518 from FIG. 5A have become divider partitions 507 in FIG. 5C, and the insertable partitions 519 from FIG. 5A have become coolant partitions 519 in FIG. 5C). Likewise, FIG. 5D shows an alternate embodiment where all of the coolant partitions 509 are insertable while all of the divider partitions 507 are fixed. (FIG. 5D is similar to FIG. 5B-all of the fixed partitions 518 of FIG. 5B are divider partitions 507 in FIG. 5D, and all of the insertable partitions 519 in FIG. 5B are coolant partitions 509 in FIG. 5D).

Referring to the arrangement shown in FIG. 5D, the divider partitions 507 divide the interior of the container into a plurality of cell compartments 505. Hence, each of the cell compartments 505 is separated from an adjacent cell compartment by a divider partition 507. Each of the divider partition is a fixed partition and is integrally formed with either the side walls (or possibly the end walls) of the container and/or with the container bottom as a one-piece construction. Preferably, the divider partition is integrally formed with the side walls and with the bottom as a one-piece construction. Hence, there is a substantially liquid-tight seal between adjacent cell compartments so that the electrolyte from one cell compartment cannot enter an adjacent compartment. Also, as shown, the fixed divider partitions are preferably all formed with a draft angle in order to facilitate the manufacturing process.

The coolant partitions 509 are insertable and are thus first formed separate from the walls and the bottom of the container, and are then inserted into the container. Generally one or more of the coolant partitions 509 are inserted into at least one of the cell compartments 5050. Preferably, a coolant partition is inserted into each of the cell compartments 505. The coolant partition may be placed adjacent to a divider partition or adjacent to an end wall.

The coolant partitions 509 are preferably made with a "reverse" draft angle. That is, they are preferably made to taper opposite to the draft angle of the divider partitions 507. As noted above, this provides for a substantially uniform compression of the electrochemical cells placed within the cell compartments 505. Preferably, at least one external face of each of the coolant partitions 509 confronts at least one plate of the electrode stack placed within the corresponding cell compartment.

Making the coolant partitions separately from the remainder of the container reduces the complexity of the mold operation for making the container. It also makes the assembly of the coolant partitions more amenable to high volume manufacturing techniques such as heat sealing, friction welding, vibration welding, and the like (for example, they can be formed from two clamshell haves that can be heat sealed together).

With regards to the embodiment shown in FIG. 5D, the cell compartments 505 are separated from each other by the fixed divider partitions 507 which form a substantially liquid-tight seal between the cell compartments 505. Hence, the container does not depend upon the coolant partitions 509 to isolate the electrolyte of one compartment from the electrolyte of another compartment. Hence, the coolant partitions 509 need not be sealed to either the side walls or to the bottom of the container to prevent the electrolyte from one cell compartment from entering another (since this is already being done by the fixed divider partitions 507). Of course, the coolant partitions 509 still perform a heat exchange function.

The openings to the coolant channels that are integral with the coolant partitions 509 may be placed on the top edges of the partitions. This further eliminates the need to seal the coolant partitions to either the side walls or bottom of the container. The coolant partitions may instead be affixed and sealed to the lid. The lid may include flow channels which serve to interconnect the coolant channels of one of the coolant partitions with the coolant channels of another of the partitions. Moreover, the coolant partitions and the lid may even be integrally formed as a one-piece construction.

In yet another embodiment of the invention, one or more of the coolant partitions may be formed as fixed partitions. Making the coolant partitions as fixed has certain advantages. There is a less possibility that electrolyte may leak from one cell compartment to an adjacent cell compartment around the periphery of the coolant partitions. Also there is less possibility that the coolant can leak out from the interior of the coolant partition (from the coolant channel openings) and into the cell compartment where it may make contact with the electrolyte. Also, in the case where the coolant partition itself is formed from two clamshell halves, there is also a possibility of coolant leakage from the seam formed when the clamshells are affixed together.

Hence, in an alternate embodiment of the monoblock container, at least one of the coolant partitions (and preferably all of the coolant partitions) may be formed as a fixed partition. Forming all of the coolant partitions as fixed partitions may prevent coolant leakage into the cell compartments and may also provide for improved structural support for the monoblock container.

At least one of the divider partitions (and preferably all of the divider partitions) may be formed as an insertable partition. By making all of the divider partitions insertable, they can be manufactured so as to compensate for the draft angle that is manufactured into the fixed coolant partitions. As explained above, this can provide for substantially uniform compression of the electrochemical cells placed within the cell compartments.

In still another embodiment of the invention, in order to provide even greater structural support for the monoblock container, all of the coolant partitions and all of the divider partitions may be formed as fixed partitions. That is, all of the partitions of the monoblock container may be formed as fixed partitions.

Hence, in one embodiment of the invention, the monoblock container includes at least one coolant partition which is formed as a fixed partition. That is, one or more of the coolant partitions (and preferably all of the coolant partitions) are integrally formed with at least one wall and/or the container bottom as a one-piece construction.

As discussed above, there are many different ways in which the fixed partitions can in integrally formed with the other parts of the battery container. These embodiments are applicable to coolant partitions that formed as fixed partition. One or more of the coolant partitions may be integrally formed with two opposite walls (such as the two side walls or two end walls) and/or with the container bottom as a one-piece construction.

In another embodiment, one or more of the coolant partitions (and preferably all of the coolant partitions), the side walls, and the end walls are all integrally formed as a one-piece construction. In yet another embodiment, one or more of the coolant partitions (and preferably all of the coolant partitions), the side walls, the end walls, and the container bottom are all integrally formed as a one-piece construction. A one-piece construction may be formed using an injection molding process. However, it may also be possible to form the side and end walls as well as the cell partitions by an extrusion process.

In another embodiment of the invention, at least one of the divider partitions and at least one of the coolant partitions are formed as fixed partitions. Hence, in another embodiment of the invention at least one coolant partition (and preferably all of the coolant partitions) and at least one divider partition (preferably all of the divider partitions) are integrally formed with at least one wall and/or the container bottom as a one-piece construction. In another embodiment, at least one coolant partition (and preferably all of the coolant partitions), at least one divider partition (and preferably all of the divider partitions), the side walls, and the end walls are all integrally formed as a one-piece construction. In still another embodiment at least one coolant partition (and preferably all of the coolant partitions), at least one divider partition (and preferably all of the divider partitions), the side walls, the end walls, and the container bottom are all integrally formed as a one-piece construction. Hence, it is possible that the battery container (all of the walls, the bottom, and all of the cell partitions) be formed as a one-piece construction.

There are many different ways in which to circulate the coolant within the coolant partitions. That is, there are many different pathways and configurations for the coolant channels within a single coolant partition. Also, there are many different ways to interconnect the coolant channels of one coolant partition with the coolant channels of at least one other coolant partitions.

Figure 6:
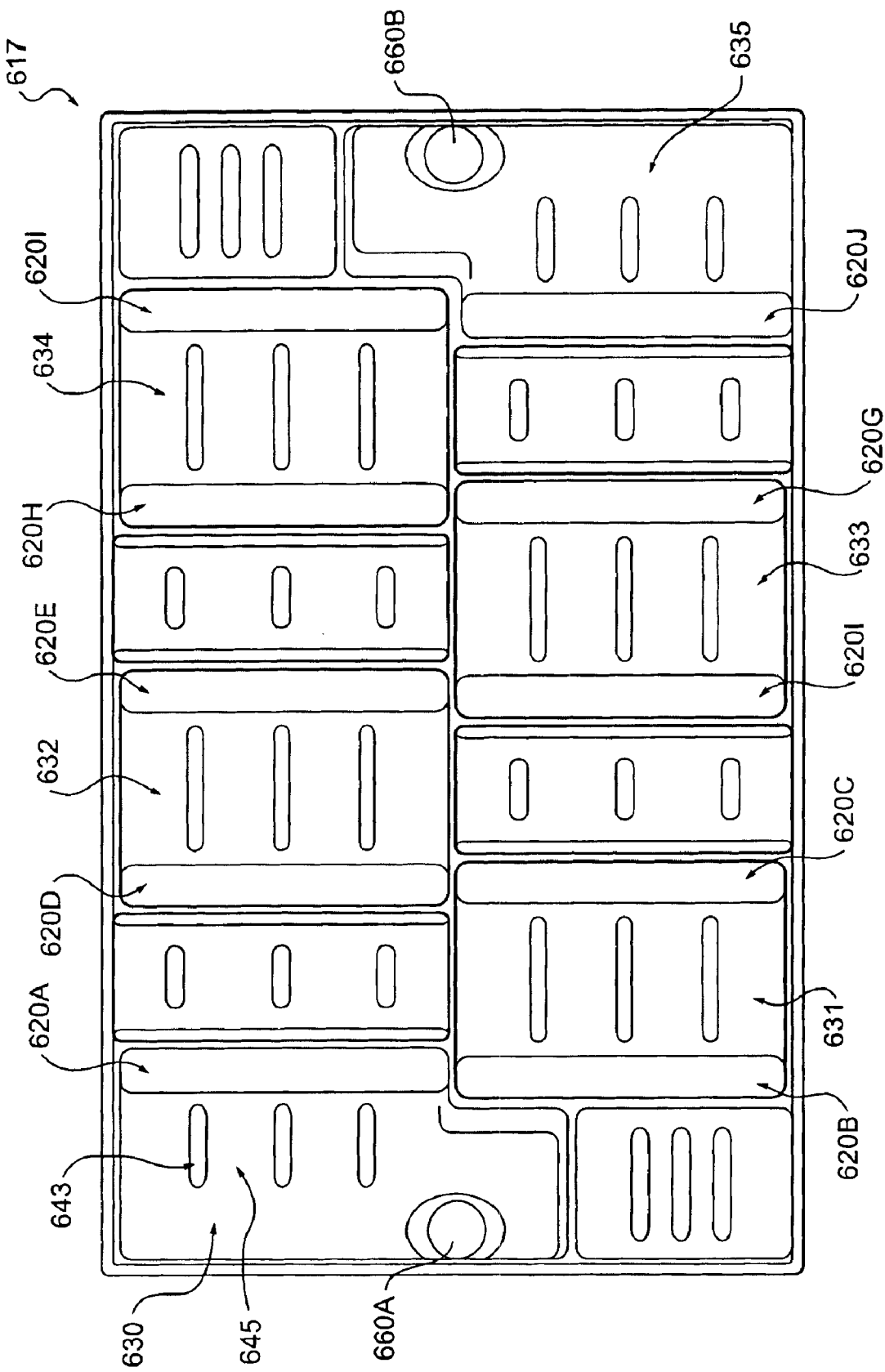
FIG. 6 is a planar view of a monoblock container bottom which includes inlets and outlets for coolant channels.

In one embodiment of the invention, the coolant enters and exits the coolant channels of each of the coolant partitions though a channel inlet and a corresponding channel outlet located on specially designed bottom of the monoblock container. FIG. 6 shows an embodiment of such a specially designed container bottom 617. The container bottom 617 includes ribs 643 which protrude from the surface of the bottom 617. The ribs 643 define baffles for fluid flow purpose. Specifically, the ribs 643 define fluid pathways 645 (the regions between the ribs) on the outer surface of the bottom. When a bottom cover, such as a rigid plate, is affixed to the outside surface of the bottom 617, the ribs 643 and the fluid pathways 645 co-operate with the bottom cover plate to define bottom flow channels that interconnect the openings of the coolant channels of different coolant partitions. Hence, the coolant channels of each of the partitions are interconnected with the coolant channels of other partitions. This creates an interconnected network of coolant channels that can circulate the coolant throughout the battery case.

Referring to FIG. 1B, the coolant may enter the monoblock container 202 via the inlet tube entrance 222 and be carried to the container bottom via the inlet tube 220. The coolant is transported via the inlet tube 220 to the inlet tube exit opening 660A of the container bottom 617 shown in FIG. 6. Referring to FIG. 6, the coolant enters the set of bottom flow channels 630 where it is directed by the flow channels to the first partition inlet 620A. The coolant enters the first coolant partition, flows through the coolant channels within the first coolant partition and then exits the first coolant partition through a first partition outlet 620B. After exiting the first partition outlet 620B, the coolant is channeled to the second partition inlet 620C via the bottom flow channels 631. The coolant circulates through the second coolant partition and exits the second coolant partition through the outlet 620D. After exiting the second coolant partition outlet 620D, the coolant is channeled to the third coolant partition inlet 620E via the bottom flow channel 632, circulate through the third partition and exits the third coolant partition through the outlet 620F. This process is repeated for the remaining coolant partitions, for the remaining inlets/outlets 620G, 620H, 620I and 620J as well as the remaining bottom flow channels 633 and 634. After the coolant exits the last partition outlet 620J, it is channeled to an outlet tube entrance 660B by the flow channels 635.

Figure 7:
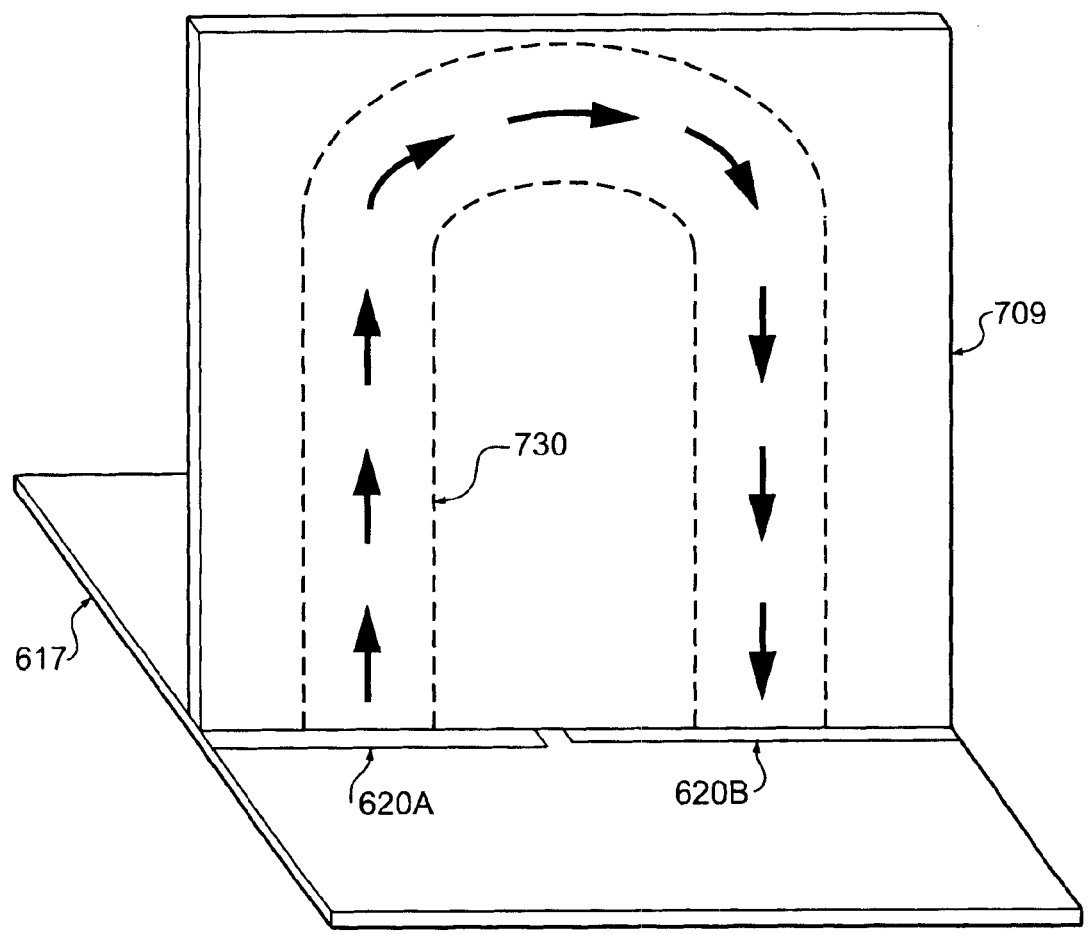
FIG. 7 is a view of a coolant partition showing the path of coolant flow through the coolant partition.

When the inlets and outlets are positioned in the container bottom, the coolant can be made to circulate through the coolant channels of each of the coolant partitions in different ways. One example of a circulation scheme is shown in FIG. 7. FIG. 7 shows a coolant partition 709 of that has partition openings in the bottom edge of the coolant partition that are aligned with the channel inlet 620A and channel outlet 620B of the container bottom 617. The arrows show the general path of the coolant that flows in the coolant channel 730 that is inside the coolant partition 709. As seen, the coolant, after entering a coolant partition via the inlet 620A, goes vertically up one half of the coolant partition, horizontally across the partition, and then vertically down the other half of the coolant partition (where it then exits via an channel outlet 620B). This is an example of a "closed loop" scheme. Closed loop intercell cooling may be used between every cell or at regular intervals, such as between every second or every third cell. The inlets and outlets of the coolant partition 709 are in the bottom edge of the coolant partitions 709.

The coolant may be routed either horizontally in a serpentine method between and around cells, or vertically, in a "semi-corkscrew" path, up and down the cells through the hollow wall of the coolant partitions, and then through passages under or above the cells. Alternately, air flow paths may be molded into the walls between the cells in a vertical or horizontal orientation.

As seen from FIG. 6, the coolant channel outlet of one coolant partition is fluidly connected to the coolant channel inlet of another coolant partition. In the particular connection scheme shown in FIG. 6, the bottom coolant channels are routing the coolant so that it must enter and exit the first coolant partition before entering the second, as so on. This is a "serial" connection. Other routing schemes are also possible. For example, the coolant may be channeled so that it enters all of the coolant partitions at essentially the same time. This is a "parallel" connection.

Figure 8B:
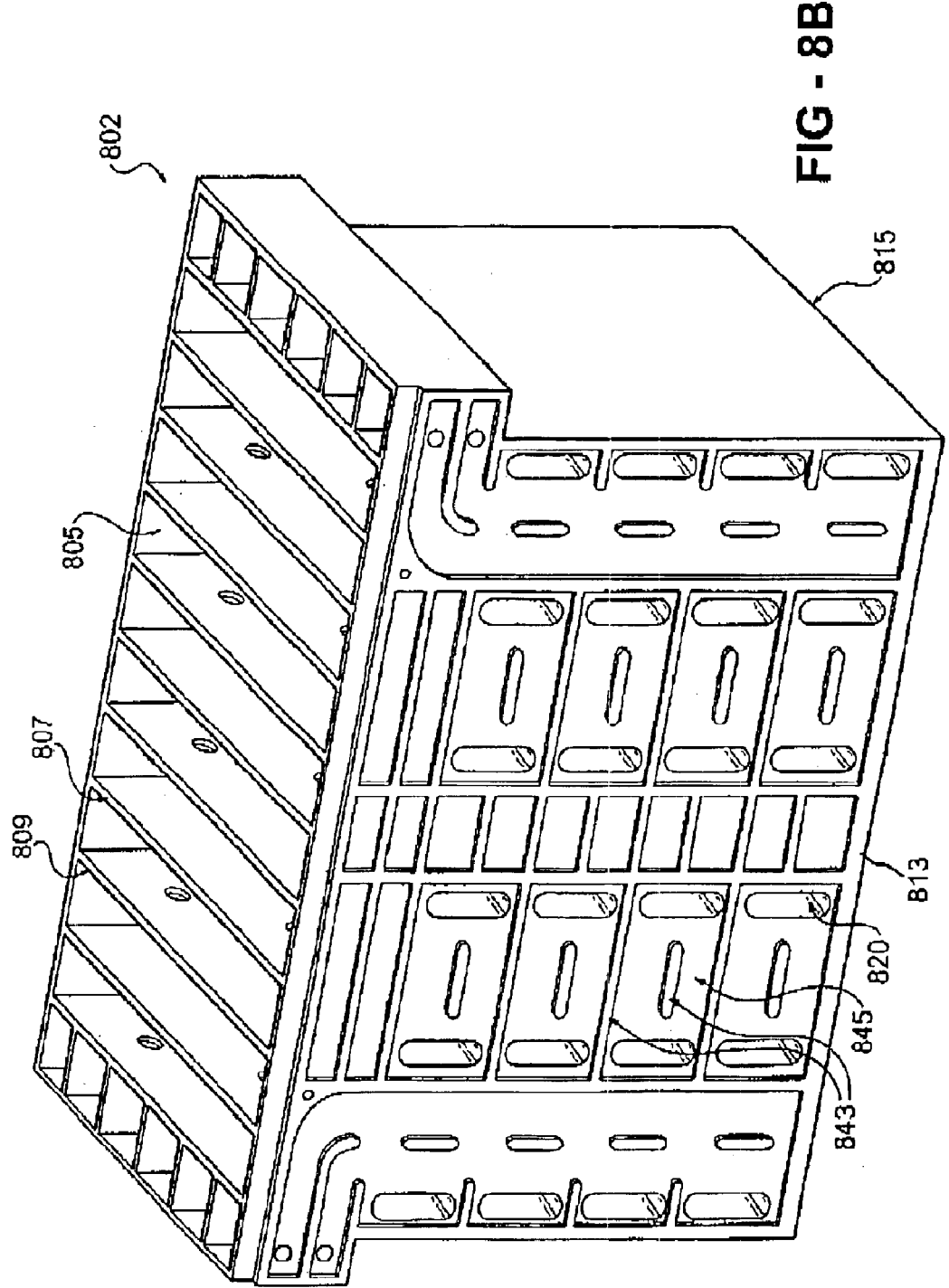
FIG. 8B is a three-dimensional view of the monoblock container from FIG. 8A showing the partitions.

Other ways of positioning the inlets and outlets of the coolant channels and of interconnecting the coolant channels are possible. An alternate embodiment of a monoblock battery case of the present invention is shown in FIG. 8A. FIG. 8A shows the monoblock battery case 800. The case includes the container 802, the lid for the container 804. Also, in the embodiment shown, the case also includes the side wall covers 810. As will be explained in more detail below, each of the side wall covers, when affixed over the side walls 813 of the container 810 co-operate with the respective side wall to define flow channels that interconnect the coolant channels in the coolant partitions. A three-dimensional view of the monoblock container 802 is shown in FIG. 8B.

Figure 8C:
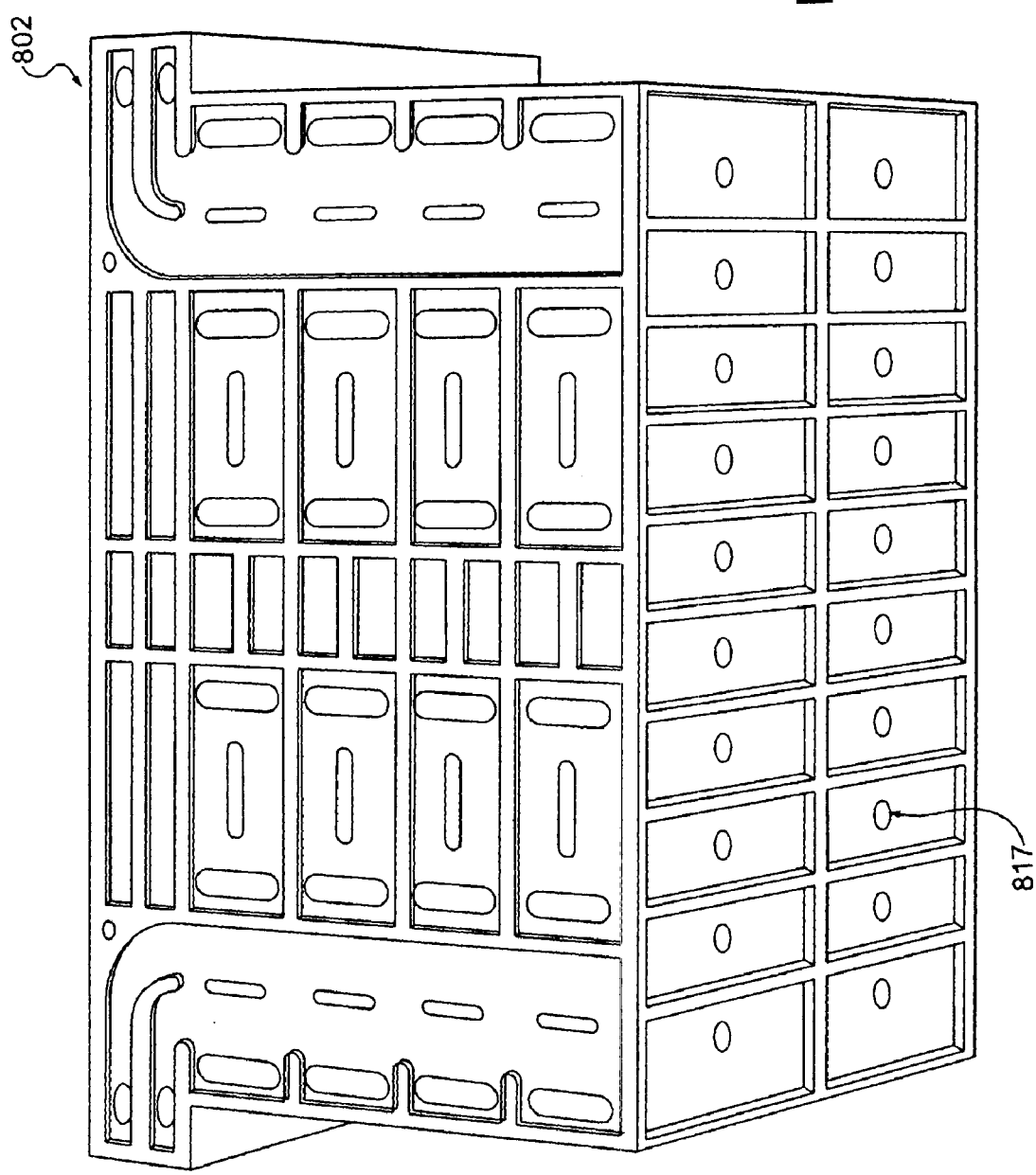
FIG. 8C is a three-dimensional view of the monoblock container from FIG. 8A showing the container bottom.

Referring to FIG. 8B, the container 802 includes two side walls 813, two end walls 815 and a bottom (not shown). It is noted that the first of the two side walls 813 is shown in FIG. 8B while the second side wall is opposite the first side wall and is hidden from view. Likewise, the first of the two end walls 815 is shown in the FIG. 8B while the second end wall is opposite the first end wall and is hidden from view. FIG. 8C is a three-dimensional view of the monoblock container 802 which shows the container bottom 817.

The monoblock container 802 further includes one or more cell partitions which divide the interior of the case into a plurality of cell compartments. As discussed above, each of the cell partitions may be either a divider partition or a coolant partition. The divider partitions 807 do not include coolant channels while the coolant partitions 809 include coolant channels. Preferably, the monoblock container 802 includes at least one coolant partition.

Preferably, the coolant channels are formed integral with the coolant partitions. More preferably, the coolant channels are preferably formed in the interior of the coolant partitions. In addition, the coolant partition may be formed as a one-piece construction.

In the embodiment of the monoblock container 802 shown in FIG. 8B, the inlets and outlets of the coolant channels are formed in the side walls 813 of the container. Each opening 820 may be either an inlet or an outlet of a coolant channel depending upon the direction of the coolant flow within the coolant channel. Placing the inlets and outlets of the coolant channels in the side walls provides for increased reliability since it separates coolant channel seals from the bottom electrolyte seals.

Figure 8D:
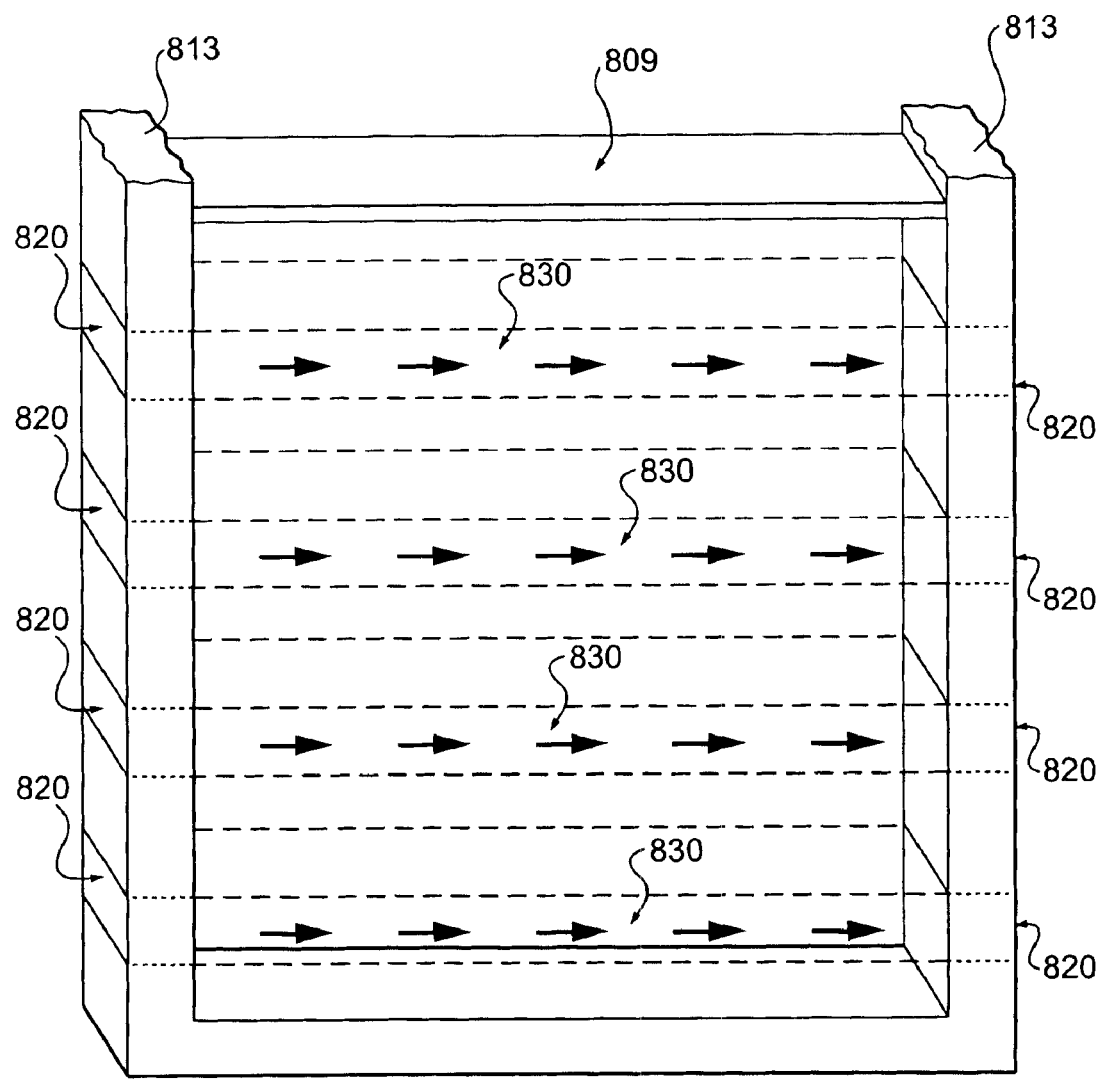
FIG. 8D is a cross-sectional view of the monoblock container shown in FIG. 8A, showing the flow of coolant through a cooling partition.

FIG. 8D shows a cross-sectional view of a coolant partition 809 along the width of the monoblock case (i.e., in a direction parallel to the endplates 815). The arrows indicate the direction of the coolant flow through the coolant channels 830 inside the coolant partition. The inlet and outlet openings of the coolant partition 809 are on the vertical edges of the periphery of the partition. The coolant channels 830 guide the coolant from one side wall 813 to the opposite side wall 813. This is an example of a "cross-flow design".

Figure 8E:
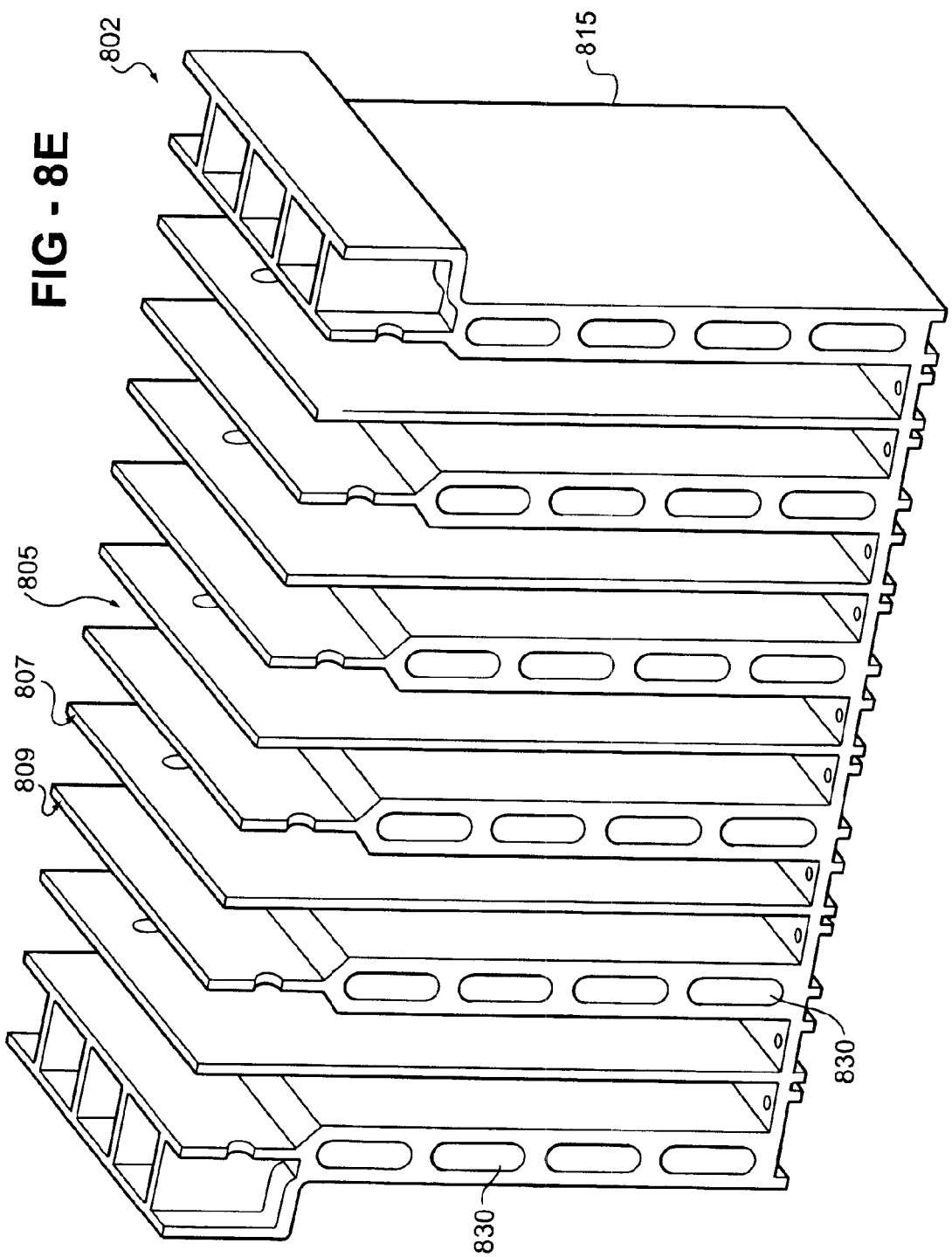
FIG. 8E is a cross-sectional view of the monoblock container shown in FIG. 8A, showing the cooling channels within the cooling partitions.

In the example shown in FIG. 8D, the coolant channels are substantially horizontally disposed and the direction of the coolant flow is substantially parallel to the external faces of the coolant partition. FIG. 8E shows a cross-sectional view of the monoblock container 802, through the cell partitions, along the length of the container (that is, parallel to the side walls 813). FIG. 8E shows substantially horizontally disposed coolant channels 830 that are integrally formed within the interior of the coolant partitions 809. Other configurations for the coolant channels are also possible. For example, the coolant channels may be slanted such that they are neither horizontal or vertical. Alternately, the coolant channels may take a circuitous route through the partitions.

Also, in the embodiment shown in FIG. 8D, the inlet and the outlet of the same coolant channel are on opposite side walls. It is also possible that the inlet and the outlet of the same coolant channel are on the same side wall.

Preferably, the coolant channels within one of the coolant partitions are in communication with the coolant channels in the other coolant partitions. This creates a completely integrated cooling system which permits the coolant to flow through all of the coolant partitions. The coolant channels of different coolant partitions can be fluidly connected together in many different ways. In the embodiment of the battery case 800 shown in FIG. 8A, this is done with the use of a pair of wall covers 810. Preferably, the wall covers 810 are in the form of rigid plates (that is, they are side wall cover plates). Referring to FIG. 8A, it is seen that the outer surfaces of the side walls 813 of the container 802 includes ribs 843. The ribs 843 define baffles for fluid flow purpose. Specifically, the ribs 843 define fluid pathways 845 on the outer surface of the side walls 813. When a side wall cover 810 is affixed to its corresponding side wall 813, the ribs 843 and the fluid pathways 845 co-operate with the side wall cover 810 to define fluid channels in the side walls that are referred to herein as "side wall flow channels" or more simply as "wall channels". The wall channels interconnect the openings 820 of the coolant channels of different coolant partitions. Hence, the coolant channels of each of the coolant partitions are interconnected with the coolant channels of other coolant partitions. This creates an interconnected network of coolant channels that can circulate the coolant throughout the battery case.

It is noted that there are many other ways to interconnect the coolant channels. For example, wall channels may be integrated onto the interior of or into the surface of the side walls of the container 802. Alternately, wall channels (for example, in the form of tubes) interconnecting the openings 820 of different (or the same) coolant partitions may simply be affixed to the openings 820.

Figure 9A:
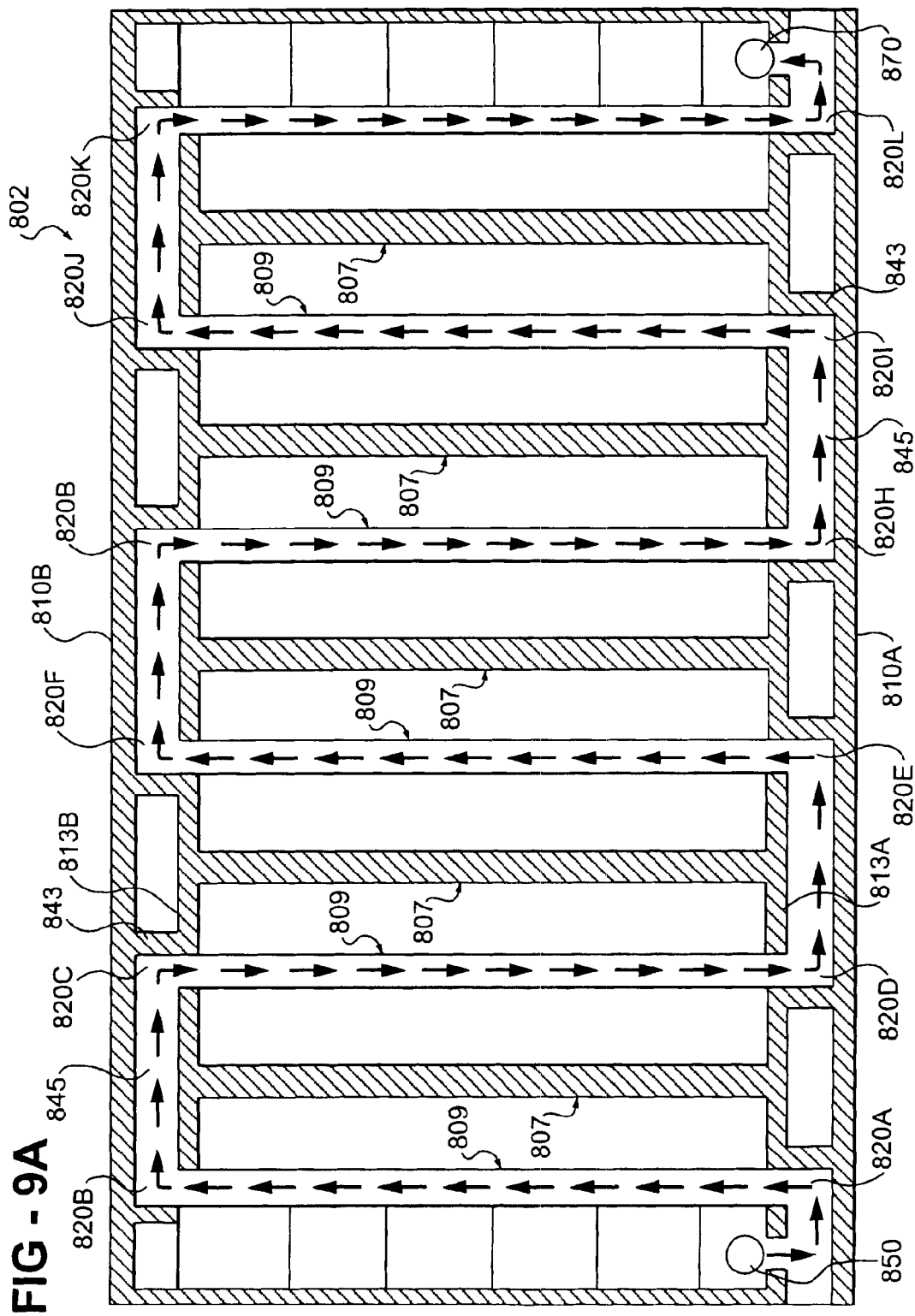
FIG. 9A is a top view of the monoblock container showing the flow of coolant through the container in a series flow configuration.

The coolant can be made to circulate through the container 802 in different ways. In one embodiment, the coolant can be directed to flow in a serpentine path, back and forth between the opposite side walls. FIG. 9A is a top view of the monoblock container 802 which more clearly shows the path of the coolant through the coolant channels. FIG. 9A shows the divider partitions 807 and the coolant partitions 809. FIG. 9A also shows the wall channels 845 which are defined by the first side wall 813A and its corresponding wall cover 8!CA, and the side wall channels 845 defined by the second side wall 813B and its corresponding side wall cover 810B. The arrows shown within the flow channels 845 shows the direction of flow of the coolant within the coolant channels.

In the embodiment shown in FIG. 9A, the coolant enters the monoblock container 802 through the container inlet 850 and is directed to the opening 820A (a channel inlet) in the first side wall 813A. The coolant is directed by the coolant channel in the coolant partition 809 to the opening 820B (a channel outlet) in the second side wall 813B (which is opposite the first side wall 813A). The side wall flow channel 845 in the second side wall 813B then directs the coolant to the opening 820C (a channel inlet) where it is carried by the coolant partition 809 back to the first side wall 813A and exits the opening 820D (a channel outlet). This process repeats for the other cooling channel openings 820E through 820L where the coolant is then directed to the container outlet 870. Hence, the coolant is carried back and forth between the first and second side walls by the coolant channels in the coolant partitions. As discussed above, this type of flow is referred to as a "serial" connection, since the coolant is routed from one partition to another.

Another way of directing the coolant is shown in FIG. 9B. FIG. 9B shows a top view of a monoblock container 802' of the present invention with side walls 813A' and 813B'. In this embodiment, the coolant is directed from the first side wall 813A' to the second side wall 813B' by each of the coolant partitions 809. Hence, the coolant enters the coolant partitions 809 through the openings 820A, 820D, 820E, 820H, 820I, and 820L that are disposed in the first side wall 813A' and exits the coolant partition through the openings 820B, 820C, 820F, 820G, 820J, and 820K that are disposed in the second side wall 813B' The coolant is thus directed so that it enters all of the coolant partitions at substantially the same time. Hence, this configuration is referred to as a "parallel" flow configuration.

As noted above, the coolant partitions and the divider partitions may either be fixed or insertable. With regards to the embodiment of the container shown in FIG. 8B (that is, with the channel inlets and outlets on the side walls) it is preferable that one or more of the coolant partitions are fixed. It is more preferable that all of the coolant partitions are fixed. In one embodiment all of the coolant partitions are fixed while all of the divider partitions are insertable. In another embodiment, all of the coolant partitions and all of the divider partitions are fixed. Of course, the invention is not limited to these embodiments and other embodiments are also possible.

The embodiments of the invention shown in FIGS. 8A–E and 9A–B, the coolant partitions are substantially parallel to the end walls and the openings of the coolant channels are formed in the side walls of the container. Referring to FIG. 2A, it is seen that it is possible to position coolant partitions so that they are substantially parallel to the side walls of the container. Hence, it is possible that the inlets and the outlets of the coolant channels are formed in the end walls of the container. Referring to FIG. 2B, it is seen that it is also possible that that one of the openings to a coolant channel be formed in an end wall and the other opening be formed in a side wall.

It is noted that in yet another embodiment of the invention, it is possible to form at least one of the coolant partitions (and/or at least one of the divider partitions) as one-piece construction with the lid of the battery case. In this embodiment the inlets and outlets to the coolant channels are preferably formed in a portion of the lid. However, it is still possible that the inlets and outlets be formed in the walls or in the bottom of the container.

Moreover, it is noted that in the embodiments of the monoblock case shown above, specifically in FIG. 1A and in FIG. 8A, the container includes walls and a bottom. The lid is shown as a separate piece. The electrochemical cells may thus be placed into the container from the top before the lid is placed on (and preferably sealed) to the top of the container. In an alternate embodiment of the monoblock case, it is possible that the lid and the walls are formed as a one-piece construction while the "case bottom" is formed as a separate piece. In this case, the electrochemical cells may be placed into the case from the bottom of the container before the "case bottom" is actually placed onto the container.

The monoblock battery case of the present invention accommodates a plurality of electrochemical cells to form a monoblock battery. Preferably, each of the electrochemical cells is disposed into a unique one of the cell compartments. Some or all of the electrochemical cells may be electrically coupled together in a serial electrical connection and/or a parallel electrical connection. It is also possible that one or more of the cells are not electrically connected to any of the other cells. In one embodiment, all of the electrochemical cells are electrically coupled in series. In another embodiment, all of the electrochemical cells are electrically coupled in parallel. In yet another embodiment, a portion of the electrochemical cells are electrically coupled in series while a portion are electrically coupled in parallel.

FIG. 10 shows a cross-sectional view of a monoblock battery 1000 of the present invention. The cross-sectional view is parallel to the side walls. The monoblock battery 1000 includes a monoblock container 1002 and a lid 1004. The battery container includes coolant partitions 1009 as well as divider partitions 1007. The divider and coolant partitions form the battery compartments 1005. Housed within each of the cell compartments 1005 is a single electrochemical cell 1080 including a stack of positive electrodes, negative electrodes, separators and electrolyte.

In the embodiment shown in FIG. 10, the plurality of electrochemical cells 1080 are electrically coupled in series. The electrical coupling between adjacent cells may be accomplished in different ways. In the embodiment shown, the positive and negative electrodes include current collection tabs attached to the electrodes for transporting electrical energy into and out of the electrodes. The current collection tabs of the positive electrodes are all welded together into a positive interconnect 1086A. Likewise, the current collection tabs of the negative electrodes are all welded together into a negative interconnect 1086B. To connect the electrochemical cells in series, the positive interconnect 1086A of one electrochemical cell is electrical coupled to the negative interconnect 1086B of an adjacent electrochemical cell that is on the opposite side of the partition. This may be done in different ways. In the embodiment shown, this is done by placing a connection spacer 1088 through an opening in the partition and welding the ends of the connection spacer 1088 to the positive interconnect 1086A and the negative interconnect 1086B that are on the opposite sides of the partition. Connection spacers 1088 may also placed through openings in the end walls to electrically connect a positive interconnect to the positive battery terminal 1090A and a negative interconnect to the negative battery terminal 1090B.

The connection spacer may be formed from many different conductive materials. The connection spacer 1088 may comprise nickel, copper, a nickel alloy, a copper alloy, a nickel-copper alloy, a copper-nickel alloy. Further the connection spacer may comprise both copper and nickel. For example, the connection spacer may comprise nickel-plated copper, or the connection spacer may comprise a copper control portion surrounded by nickel. Alternatively, the connector may comprise a copper cylinder and a nickel wire which is spirally wrapped along the length of the copper cylinder.

The opening in the cell partition through which the interconnection spacer is placed may be sealed to prevent electrolyte communication from one of the cell compartments to the adjacent cell compartment on the other side of the cell partition. The sealing may be accomplished by using a polymer gasket such as a rubber or a plastic gasket. Sealing may also be accomplished by a hot melt adhesive or an epoxy adhesive. Sealing may also be accomplished by melting the plastic material of the partition around the connection spacer 1088.

Figure 11:
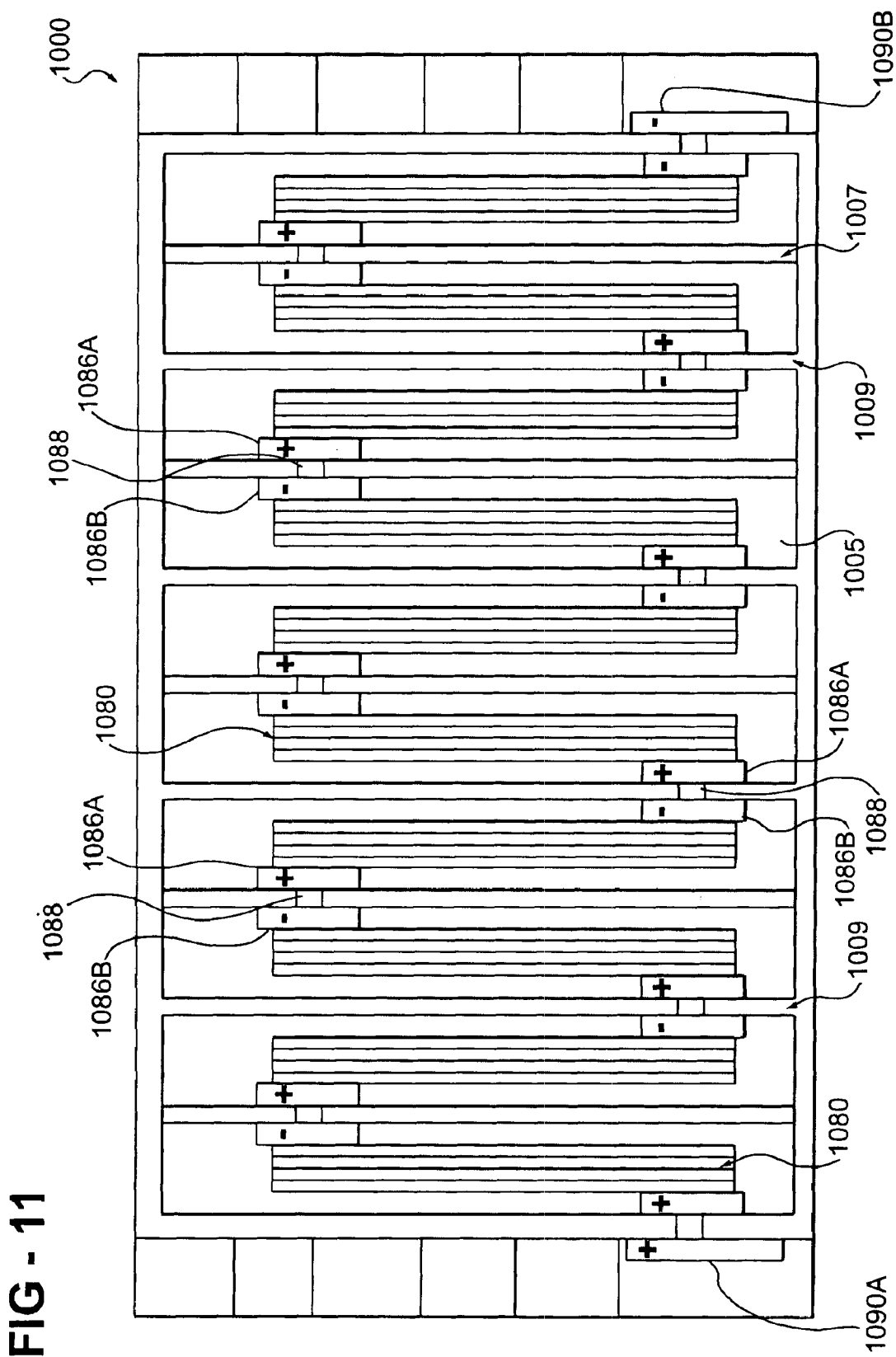
FIG. 11 is a top view of a an embodiment of the monoblock battery of the present invention showing serial electrical coupling between the electrochemical cells.

A cross-sectional top view of the monoblock battery 1000 is shown in FIG. 11. FIG. 11 shows how the positive interconnects 1086A and the negative interconnects 1086B may be electrically coupled with the connection spacers 1088 through the walls of the cell partitions to serially connect all of the electrochemical cells. FIG. 11 shows the divider partitions 1007 and the coolant partitions 1009 that form the cell compartments 1005. FIG. 11 also shows the electrochemical cells 1080 that are placed in the compartments 1005.

Figure 12:
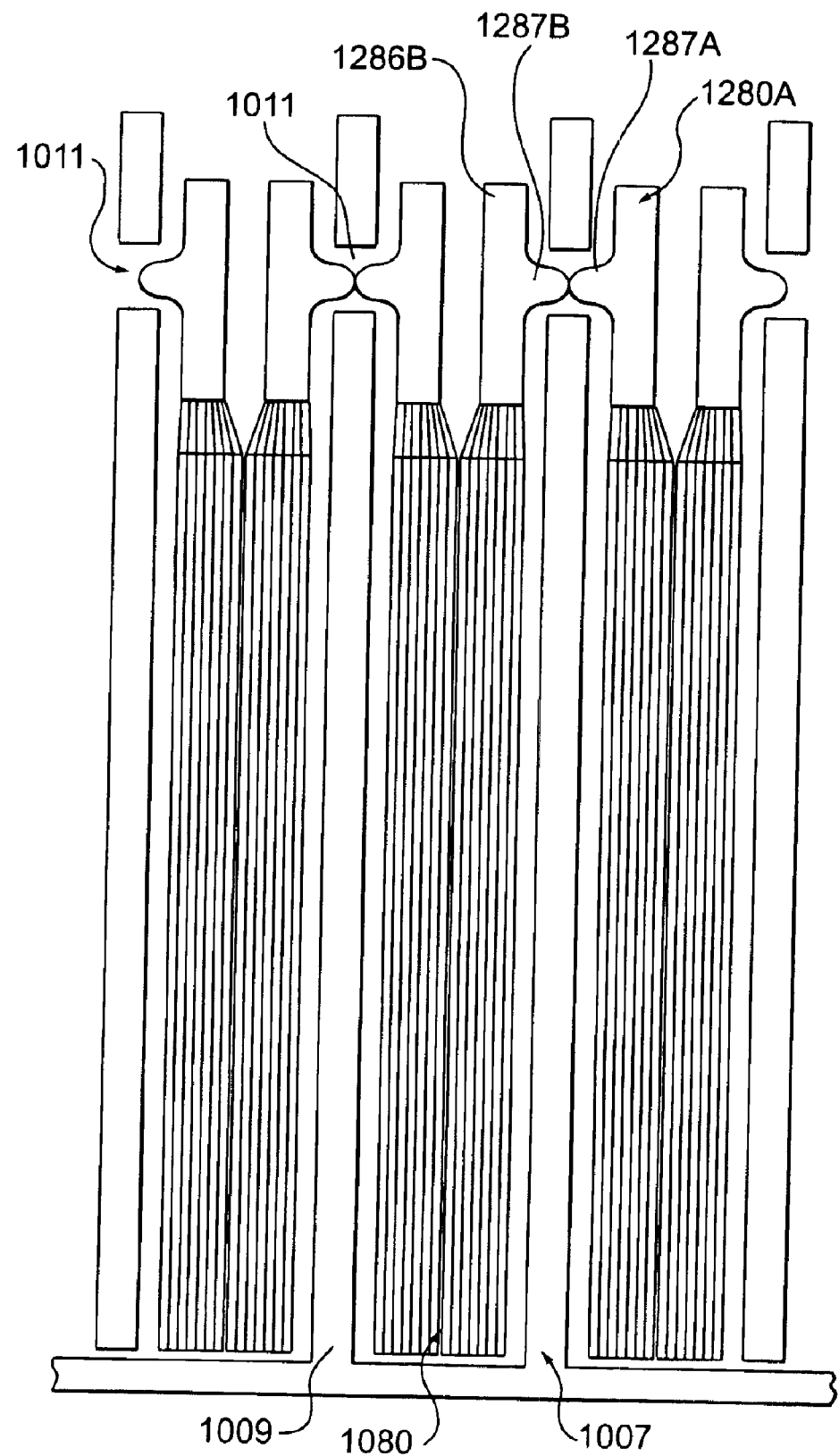
FIG. 12 is a side cross-sectional view of a portion of monoblock container showing electrical interconnects with protrusions.

It is also possible to make the connection between the positive and negative interconnects without the use of a separate connection spacer. FIG. 12 shows side view of a portion of a monoblock battery of the present invention. Shown are a modified positive interconnect 1286A and a modified negative interconnect 1286B. The modified positive interconnect 1286A and the modified negative interconnect 1286B are each formed to have protrusions 1287A and 1287B that extend through the opening 1011 in the wall of a divider partition 1007 and a coolant partition 1009. The positive interconnect protrusion 1287A makes physical and electrical contact with the negative interconnect protrusion 1287B. Hence, the corresponding positive and negative electrodes are electrically coupled. Preferably, the positive interconnect protrusion 1287A is welded to the negative interconnect protrusion 1287B.

In yet another embodiment of the invention, the positive and negative electrodes may be interconnected over the cell partitions rather than through the cell partitions. This may be done in different ways, such as by extending the positive interconnects and/or the negative interconnects over the cell partitions. It may also be done by positioning an interconnect spacer over the cell partitions.

Figure 13:
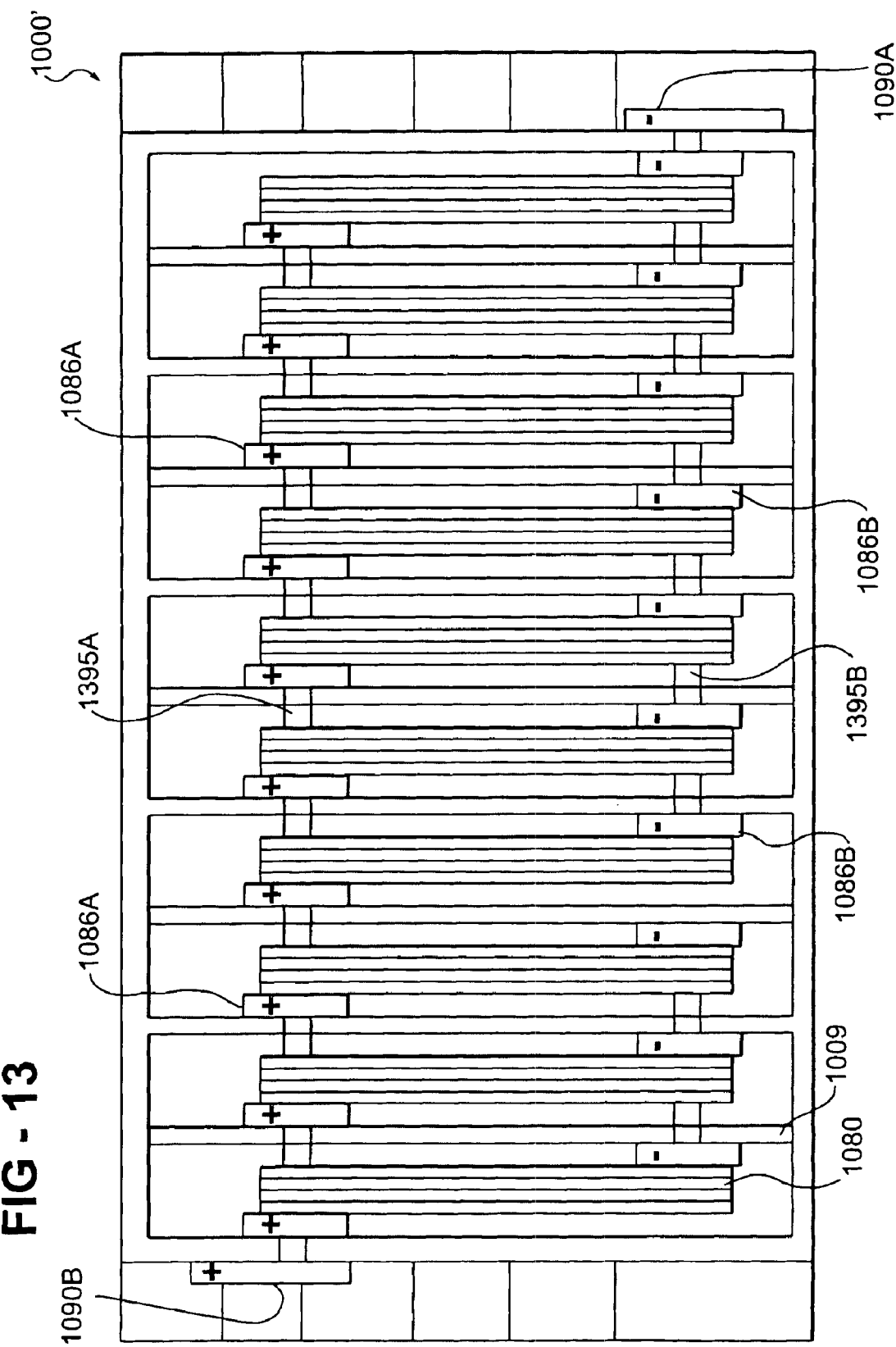
FIG. 13 is a top view of an embodiment of a monoblock battery of the present invention showing parallel electrical coupling between the electrochemical cells.

Two of more of the electrochemical cells in the monoblock battery may be electrically coupled in parallel. FIG. 13 shows a top view of an embodiment of the monoblock battery 1000' of the present invention wherein all of the electrochemical cells are electrically coupled in parallel. Referring to FIG. 13, it is seen that positive interconnects 1086A are all electrically coupled together and to the positive battery terminal 1090A. The electrically coupling is done by a first electrical contact strip 1395A that preferably goes through the cell partitions. Likewise, negative interconnects 386B are all electrically coupled together and to the negative battery terminal 1090B. The electrically coupling is done by a second electrical contact strip 1395B that preferably goes through (or over) the cell partitions.

Referring again to FIG. 10, it is seen that the monoblock battery 1000 comprises a battery case including a battery container 1002 and a lid 1004 for the container. The case is preferably designed so that the electrolyte within each of the cell compartments is isolated from the electrolyte of any other of the cell compartments. This is done to avoid self-discharge electrical shorting paths between the cells. However, it is preferable that the gasses from each of the individual cells are all shared within a common region of the battery case. In the embodiment shown in FIG. 10, each of the openings in the too of the cell compartments 1005 is covered with a gas-permeable, hydrophobic membrane 1060. The membrane coverings 1060 will prevent the escape of the electrolyte from each compartment. However, since they are gas-permeable, they will permit the gases from each of the cell compartments to enter the common region 1020 within the batter case. Hence, gases from each of the electrochemical cells are shared in a common region of the monoblock case. The battery case thus serves as a common pressure vessel for all of the electrochemical cells. The battery case is preferably sealed; however, it may include one or more pressure relief vents 1030.

Figure 14:
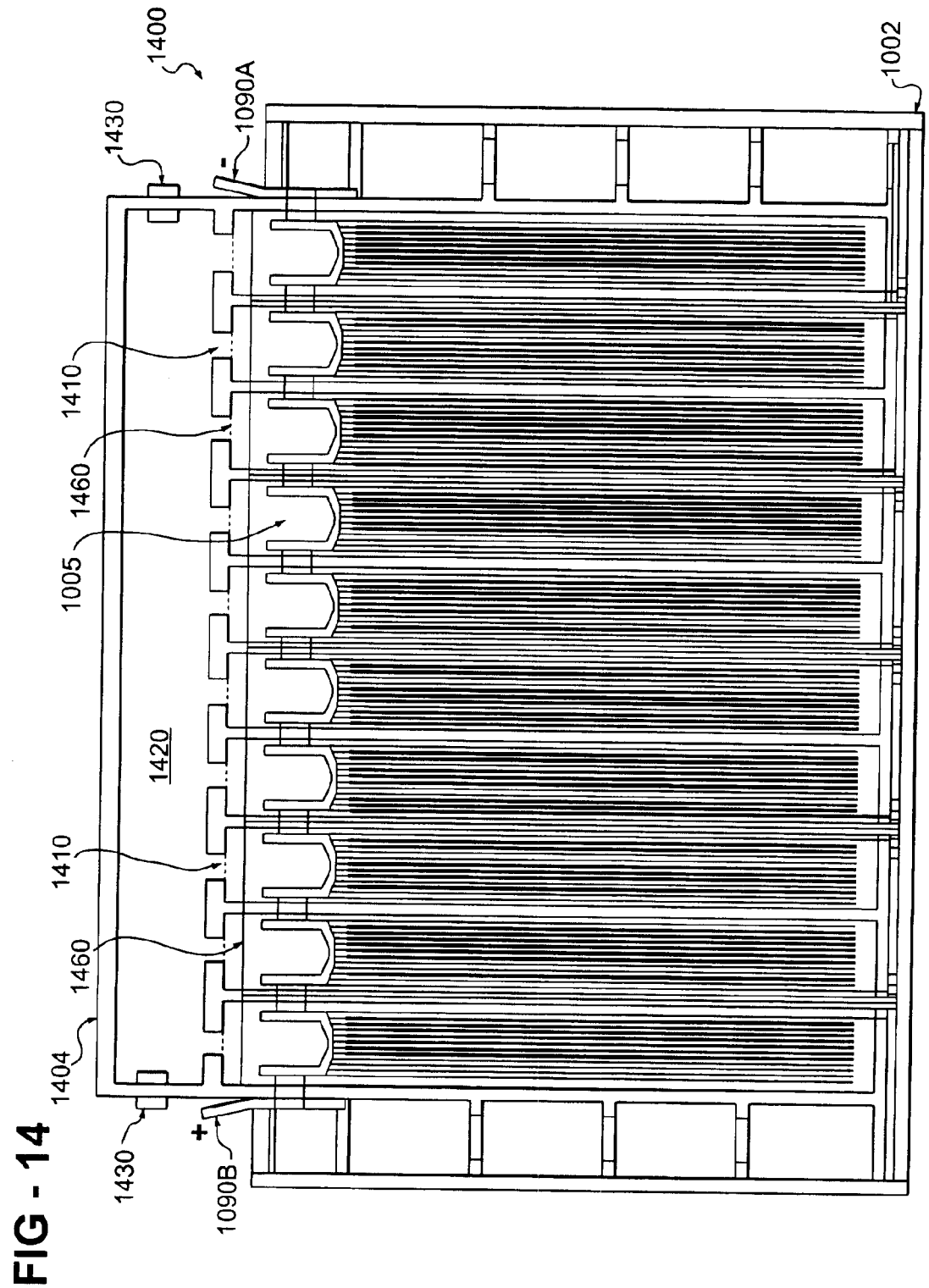
FIG. 14 is a side view of an embodiment of a monoblock battery of the present invention, showing a specially designed lid that includes a common gas region.

The common region 1020 of the battery case may be incorporated into a specially designed lid for the container. FIG. 14 shows a cross-sectional view of an embodiment of a monoblock battery 1400 of the present invention. The monoblock battery 1400 includes the container 1002 that was shown in FIG. 10. However, the battery 1400 includes a specially designed lid 1404 which is sealingly fitted to the top of the monoblock container 1002. The lid 1404 includes a plurality of gas channels 1410 which provide gaseous communication between each of the cell compartments 1005 and a common gas region 1420 which is within the lid.

The gas channels are designed to prevent electrolyte communication from compartment to another. This is done by sandwiching the gas-permeable, hydrophobic membrane 1060 between the gas channel 1410 and the opening of the cell compartment 1005.

The hydrophobic membrane 1060 shown in FIG. 10 and FIG. 14 may be formed of a material that has a gas diffusion surface area sufficient to compensate for the overcharge gas evolution rate. The may be from about 5 $cm^2$ to about 50 $cm^2$ per 12 Ah cell. Generally, the hydrophobic material is any material which allows passage of the battery gases but not the battery electrolyte. Examples of materials are materials comprising polyethylene with calcium carbonate filler. Other examples include many types of diaper material. An example of a material which may be used is the breathable type XBF-100W EXXAIRE film that is supplied by Tridegar products. This film is a polyethylene film that has been mixed with fine calcium carbonate particles and then further stretched to make it porous. In one embodiment, the layer is chosen to have a thickness of about 0.25 gauge (0.25 g per square meters), which corresponds to about 0.001 inch. The Gurley porosity of the material is chosen to be about 360 (360 seconds for 100 cc of gas to pass per square inch with a gas pressure of 4.9 inches of water). The hydrophobic nature of this film is demonstrated by a very high contact angle in 30% KOH electrolyte of about 120 degrees.

Figure 15A:
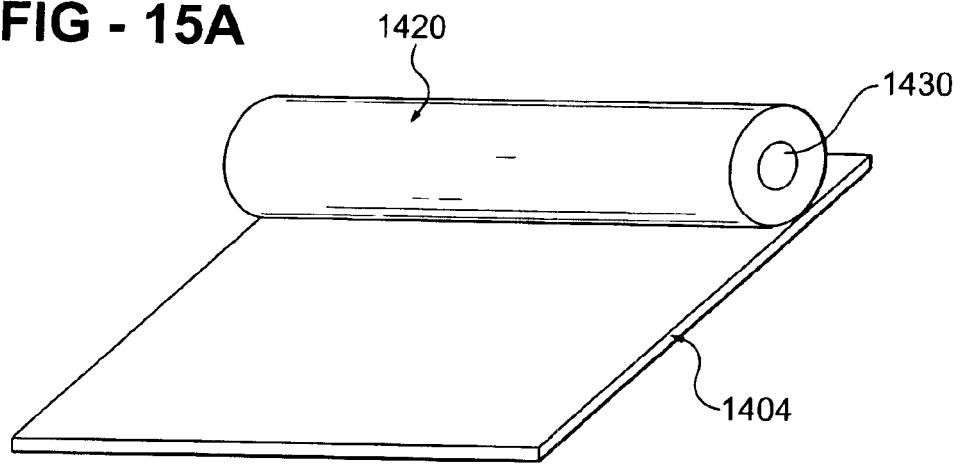
FIG. 15A is a three-dimensional view of the lid shown in FIG. 14 that shows the common gas compartment on the top of the lid.
Figure 15B:
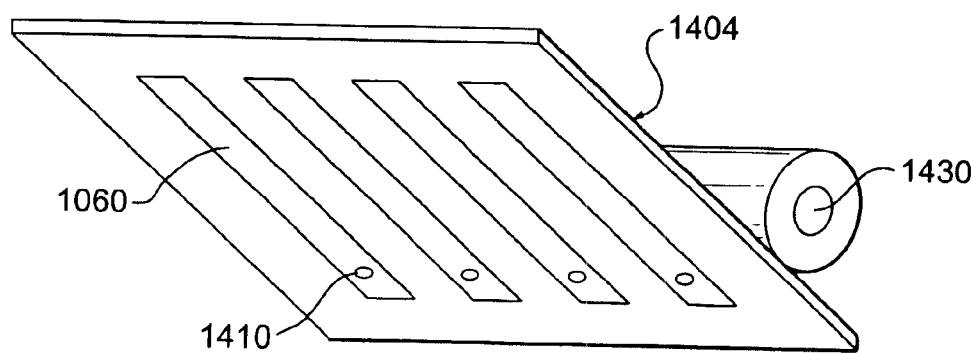
FIG. 15B is a three-dimensional view of the lid shown in FIG. 14 that shows the gas channels on the bottom of the lid.

The lid 1404 also includes a pair of pressure relief vents 1430 for the common pressure region 1420. FIGS. 15A and 15B are three-dimensional top and bottom perspectives of the lid 1404, showing the gas channels 1410, the hydrophobic membranes 1460 and the common gas compartment 1420.

Referring to the monoblock container 1002 shown in FIGS. 10 and 14, it is noted that it is possible to place a hydrophobic material around the border of the opening of each of the cell compartments 1005 rather than to cover each of the compartments with the gas-permeable, hydrophobic membrane 1060. The hydrophobic border would be sufficient to break the creep path of the electrolyte so that electrolyte from one cell would be prevented from creeping over a partition wall and into an adjacent cell compartment.

Generally, the electrolyte used in the monoblock battery of the present invention may be any aqueous or nonaqueous electrolyte. An example of a nonaqueous electrochemical cell is a lithium-ion cell which uses intercalation compounds for both anode and cathode and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Preferably, the electrochemical cell of the present invention is an alkaline electrochemical cell. The alkaline electrolyte may be an aqueous solution of an alkali hydroxide. Preferably, the alkaline electrolyte includes an aqueous solution of potassium hydroxide, sodium hydroxide, lithium hydroxide or mixtures thereof. The alkaline electrolyte may be a mixed hydroxide of potassium and lithium hydroxide.

Generally, the positive and negative active materials used in the monoblock battery of the present invention may be any type of active battery materials used in the art. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the positive active material is a nickel hydroxide material. Examples of negative electrode materials include metallic lithium and like alkali metals, alloys thereof, alkali metal absorbing carbon materials, zinc, cadmium hydroxide, hydrogen absorbing alloys, etc. Preferably, the active negative electrode material is a hydrogen absorbing alloy. It is within the spirit and intent of this invention that any hydrogen absorbing alloy can be used. Hence, in a preferable embodiment of the present invention, each electrochemical cell is a nickel-metal hydride cell comprising negative electrodes including hydrogen storage materials as the active material, and positive electrodes including nickel hydroxide active material.

Hence, in an embodiment of the present invention, the monoblock battery is a nickel-metal hydride monoblock battery. Hence, an embodiment of the monoblock battery of the present invention may thus operate at pressures of at least the standard operating pressures of a sealed nickel-metal hydride battery. This may vary depending upon the actual hydrogen storage alloys, nickel hydroxide materials used as the active materials. In one embodiment of the invention, the monoblock battery may operate at a peak pressure of at least 10 psi, preferably at a peak pressure of at least 25 psi and more preferably at a peak pressure of at least 50 psi. In another embodiment of the invention, the monoblock battery may operate at peak pressures up to about 140 psi. Hence, it is preferable that an embodiment of the monoblock case should be able to withstand peak operating pressures from about 10 psi to about 140 psi. Of course, the monoblock battery and monoblock case of the present invention are not limited to such operating pressures.

The monoblock case of the present invention (for example the container, the lid and the partitions) is preferably formed of a non-conductive material. Examples of materials which may be used include, but not limited to plastics as well as certain ceramic materials.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

We claim:

1. A multi-cell battery, comprising:
    a battery case comprising:
    a monoblock battery container including having side walls, end walls, and one or more cell partitions dividing the interior of said container into a plurality of cell compartments,
    at least one coolant channel integrally formed with at least one of said cell partitions, said coolant channel having an inlet entrance port and an outlet exit port formed in at least one of said side walls and/or at least one of said end walls, and
    at least one wall channel integrally formed with at least one of said side walls and/or at least one of said end walls, said wall channel fluidly coupled to said coolant channel; and
    a plurality of electrochemical cells disposed within said battery case, said electrochemical cells having electrode plates which are substantially perpendicular to said side walls and substantially parallel to said end walls.

2. The battery of claim 1, wherein said inlet entrance port is formed in at least one of said side walls.

3. The battery of claim 1, wherein said inlet entrance port and said outlet exit port are formed in the same one of said side walls or the same one of said end walls.

4. The battery of claim 1, wherein said inlet entrance port is formed in a first one of said side walls and said outlet exit port is formed in a second one of said side walls.

5. The battery of claim 1, wherein said case is a common pressure vessel for said electrochemical cells.

6. The battery of claim 1, wherein each of said at least one wall channel is defined by a region between a wall cover and a corresponding side wall or a corresponding end wall of said container.

7. The battery of claim 1, wherein each of said electrochemical cells is disposed in a unique one of said cell compartments.

8. The battery of claim 1, wherein said battery container comprises a plastic.

9. The battery of claim 1, wherein said at least one coolant channel is substantially horizontally disposed.

10. The battery of claim 1, wherein said electrochemical cells are nickel-metal hydride cells.

11. The battery of claim 1, wherein said battery operates at a peak pressure of at least 10 psi.

12. The battery of claim 1, wherein said partitions includes a first partition and a second partition, said at least one coolant channel includes a first coolant channel integrally formed with said first partition and a second coolant channel integrally formed with said second partition, said first coolant channel and said second coolant channel being fluidly coupled by said wall channel.

13. The battery of claim 1, wherein said at least one wall channel is integrally formed with at least one of said side walls.

14. The battery of claim 1, wherein said at least one wall channel comprises a tube affixed to at least one of said side walls and/or at least one of said end walls.

15. The battery of claim 1, wherein said at least one wall channel is formed on the surface of at least one of said side walls and/or at least one of said end walls.

16. The battery of claim 1, wherein said at least one wall channel is formed in the interior of at least one of said side walls and/or at least one of said end walls.

17. The battery of claim 1, wherein said at least one coolant channel and said at least one wall channel are part of a circulation system through which a liquid coolant circulates.

18. The battery of claim 1, wherein said at least one wall channel is integrally formed with at least one of said side walls and/or at least one of said end walls as a one-piece construction.

19. A multi-cell battery, comprising:
    a battery case comprising a monoblock battery container, said container comprising one or more partitions dividing said container into a plurality of cell compartments, said partitions comprising a first partition having a first coolant channel and a second partition including a second coolant channel, said first coolant channel and said second coolant channel fluidly coupled by a wall channel integrally formed with a side wall or an end wall of said container; and
    a plurality of electrochemical cells disposed in said battery case, said electrochemical cells having electrode plates which are substantially perpendicular to said side wall and substantially parallel to said end wall.

20. The battery of claim 19, wherein said wall channel is formed on a surface of said side wall or said end wall.

21. The battery of claim 19, wherein said wall channel is formed in the interior of said side wall or said end wall.

22. The battery of claim 19, wherein said wall channel is a tube affixed to said side wall or said end wall.

23. The battery of claim 19, wherein said wall channel is defined by the region between said side wall or said end wall and a wall cover adjacent to said side wall or said end wall.

24. The battery of claim 19, wherein said first coolant channel, said second coolant channel and said wall channel are part of a circulation system through which a liquid coolant circulates.

25. The battery of claim 19, wherein said battery case is a common pressure vessel for said electrochemical cells.

26. The battery of claim 19, wherein said wall channel is integrally formed with said side wall of said container.

27. The battery of claim 19, wherein said wall channel is integrally formed with said side wall or said end wall as a one-piece construction.

28. The battery of claim 19, wherein said electrochemical cells are nickel-metal hydride cells.

29. A multi-cell battery, comprising:
    a battery case comprising a monoblock battery container, said container comprising at least one cell partition dividing said container into at least two cell compartments, said cell partition having a coolant channel, said coolant channel fluidly coupled to a wall channel integrally formed with a side wall or an end wall of said container; and
    a plurality of electrochemical cells disposed in said battery case, said electrochemical cells having electrode plates which are substantially perpendicular to said side wall and substantially parallel to said end wall.

30. The battery of claim 29, wherein said wall channel is integrally formed with said side wall.

31. The battery of claim 29, wherein said wall channel is integrally formed with said side wall or said end wall as a one-piece construction.

32. The battery of claim 29, wherein said battery case is a single pressure vessel for all of said electrochemical cells.

33. The battery of claim 29, wherein said electrochemical cells are nickel-metal hydride cells.

34. A multi-cell battery, comprising:

a battery case comprising a monoblock battery container, said container comprising at least one cell partition dividing said container into at least two cell compartments, each of said cell compartments housing an electrochemical cell, said cell partition having a coolant channel, said coolant channel fluidly coupled to a wall channel integrally formed with a wall of said container, said wall being substantially perpendicular to said cell partition.

35. The battery of claim 34, wherein said wall channel is integrally formed with said wall as a one-piece construction.

36. The battery of claim 34, wherein said battery case is a common pressure vessel for said electrochemical cells.

37. The battery of claim 34, wherein said coolant channel and said wall channel are part of a circulation system through which a liquid coolant circulates.

38. The battery of claim 34, wherein said wall does not create any additional cell compartments housing any additional electrochemical cells.

39. A multi-cell battery, comprising:

a battery case comprising a monoblock battery container, said container comprising at least one cell partition dividing said container into at least two cell compartments, each of said cell compartments housing an electrochemical cell, said cell partition having a coolant channel, said coolant channel fluidly coupled to a wall channel integrally formed with a wall of said container, said wall not creating any additional cell compartments housing any additional electrochemical cells.

40. The battery of claim 39, wherein said wall channel is integrally formed with said wall as a one-piece construction.

41. The battery of claim 39, wherein said coolant channel and said wall channel are part of a circulation system through which a liquid coolant circulates.

* * * * *